(12) United States Patent
Nishio et al.

(10) Patent No.: US 11,274,864 B2
(45) Date of Patent: Mar. 15, 2022

(54) AIR-CONDITIONING APPARATUS

(71) Applicant: Mitsubishi Electric Corporation, Chiyoda-ku (JP)

(72) Inventors: Jun Nishio, Chiyoda-ku (JP); Soshi Ikeda, Chiyoda-ku (JP); Katsuhiro Ishimura, Chiyoda-ku (JP); Kohei Ogura, Chiyoda-ku (JP); Koji Yamashita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 51 days.

(21) Appl. No.: 16/639,946

(22) PCT Filed: Oct. 5, 2017

(86) PCT No.: PCT/JP2017/036265
§ 371 (c)(1),
(2) Date: Feb. 18, 2020

(87) PCT Pub. No.: WO2019/069423
PCT Pub. Date: Apr. 11, 2019

(65) Prior Publication Data
US 2020/0248943 A1 Aug. 6, 2020

(51) Int. Cl.
*F25B 45/00* (2006.01)
*F25B 13/00* (2006.01)

(52) U.S. Cl.
CPC .............. *F25B 45/00* (2013.01); *F25B 13/00* (2013.01)

(58) Field of Classification Search
CPC .......... F25B 45/00; F25B 13/00; F25B 41/22; F25B 41/20; F25B 2313/006;
(Continued)

(56) References Cited

U.S. PATENT DOCUMENTS

2017/0198946 A1* 7/2017 Takenaka ................ F25B 41/20
2018/0142931 A1 5/2018 Takagi
(Continued)

FOREIGN PATENT DOCUMENTS

EP 3 467 406 A1 4/2019
EP 3 598 023 A1 1/2020
(Continued)

OTHER PUBLICATIONS

International Search Report dated Dec. 12, 2017 in PCT/JP2017/036265 filed on Oct. 5, 2017, 1 page.
(Continued)

*Primary Examiner* — Kun Kai Ma
(74) *Attorney, Agent, or Firm* — Oblon, McClelland, Maier & Neustadt, L.L.P.

(57) ABSTRACT

An air-conditioning apparatus includes a refrigeration circuit, a first shut-off device, a leakage detection device, and a controller configured to perform a refrigerant recovery operation in a case where refrigerant leakage is detected. At the time of the refrigerant recovery operation, the controller performs control to perform a first operation of recovering refrigerant from a load-side heat exchanger into an accumulator and a heat-source-side heat exchanger, and a second operation of moving refrigerant in the heat-source-side heat exchanger to the accumulator. In the first operation, the first shut-off device is closed, a flow passage switching device is brought into a first connection state, and a compressor is driven. The second operation is performed after the first operation, and in the second operation, the connection state of the flow passage switching device is switched to a second connection state in a state where the compressor is being operated.

14 Claims, 11 Drawing Sheets

(58) Field of Classification Search
CPC .... F25B 2313/0233; F25B 2313/02741; F25B 2400/19; F25B 2500/22; F25B 2600/0251; F25B 2600/0253; F25B 2600/11; F25B 2600/2507; F25B 2600/2513; F25B 2600/2519; F25B 2700/1931; F25B 2700/1933; F25B 49/005; F25B 49/02; F24F 11/36; F24F 11/89; Y02B 30/70
See application file for complete search history.

(56) References Cited

U.S. PATENT DOCUMENTS

| | | | | |
|---|---|---|---|---|
| 2019/0242602 | A1* | 8/2019 | Yamada | F25B 13/00 |
| 2019/0331377 | A1* | 10/2019 | Matsuda | F25B 49/02 |
| 2019/0390876 | A1* | 12/2019 | Matsuda | F25B 49/02 |
| 2019/0390877 | A1* | 12/2019 | Sakae | F25B 45/00 |
| 2020/0011580 | A1* | 1/2020 | Matsuda | F25B 13/00 |
| 2020/0166257 | A1* | 5/2020 | Wada | F25B 49/02 |
| 2020/0240686 | A1* | 7/2020 | Yajima | F25B 49/02 |
| 2020/0248943 | A1* | 8/2020 | Nishio | F25B 13/00 |

FOREIGN PATENT DOCUMENTS

| | | |
|---|---|---|
| JP | 11-142004 A | 5/1999 |
| JP | 2007-178026 A | 7/2007 |
| JP | 2013-178073 A | 9/2013 |
| JP | 2015-87071 A | 5/2015 |
| JP | 2017-20776 A | 1/2017 |
| JP | 6079055 B2 | 2/2017 |
| JP | 6081033 B1 | 2/2017 |

OTHER PUBLICATIONS

Combined Chinese Office Action and Search Report dated Feb. 26, 2021 in Patent Application No. 201780095342.8 (with English language translation), 18 pages.
Extended European Search Report dated Sep. 16, 2020 in corresponding European Patent Application No. 17928013.6, 13 pages.

* cited by examiner

AIR-CONDITIONING APPARATUS

TECHNICAL FIELD

The present disclosure relates to an air-conditioning apparatus where refrigerant circulates in a refrigeration circuit, and is capable of reducing the amount of refrigerant leaking into a room.

BACKGROUND ART

Up to current times, an air-conditioning apparatus has been known that includes a refrigerant circuit where an outdoor unit and a plurality of indoor units are connected, and a leakage detection device configured to detect leakage of refrigerant from an indoor unit, with which, when leakage is detected, refrigerant is circulated in such a manner that a pressure of refrigerant in an indoor circuit is reduced (for example, see Patent Literature 1). In Patent Literature 1, in a case where there is leakage of refrigerant from an indoor unit, a speed of leakage of the refrigerant is reduced by reducing a pressure difference between a refrigerant pressure at the indoor unit and an atmospheric pressure in an indoor space. Specifically, control is performed to reduce an opening degree of an expansion valve between an outdoor heat exchanger and an indoor heat exchanger, for example.

Furthermore, there has hitherto been known an air-conditioning apparatus further including a bypass, in which, when leakage of refrigerant from an indoor unit occurs, refrigerant inside the air-conditioning apparatus is recovered, through the bypass, into an outdoor heat exchanger and an accumulator (for example, see Patent Literature 2). With the air-conditioning apparatus of Patent Literature 2, a bypass pipe connects a liquid side of the outdoor heat exchanger and an upstream portion of the accumulator, and a bypass valve is provided on the bypass pipe. In a case where the outdoor heat exchanger is liquid-filled during execution of a refrigerant recovery operation of recovering refrigerant, the air-conditioning apparatus of Patent Literature 2 suspends the refrigerant recovery operation, opens the bypass valve and discharges stored refrigerant from the outdoor heat exchanger into the accumulator, and resumes the refrigerant recovery operation. In this manner, the air-conditioning apparatus of Patent Literature 2 increases the amount of refrigerant recovery and reduces the amount of refrigerant leaking into a room.

CITATION LIST

Patent Literature

Patent Literature 1: Japanese Unexamined Patent Application Publication No. 2013-178073
Patent Literature 2: Japanese Unexamined Patent Application Publication No. 2015-87071

SUMMARY OF INVENTION

Technical Problem

However, with an air-conditioning apparatus as described in Patent Literature 1, while the amount of leakage is reduced by reducing the refrigerant pressure at the indoor unit, refrigerant continues to leak after leakage of the refrigerant is detected by the leakage detection device until the indoor unit suffering from refrigerant leakage is repaired. Furthermore, with an air-conditioning apparatus as described in Patent Literature 2, a discharge rate of stored refrigerant is limited by a flow coefficient of the bypass valve, and thus, a period of time during which the refrigerant recovery operation is suspended is prolonged.

To solve the problems as mentioned above, an air-conditioning apparatus capable of efficiently recovering refrigerant on an indoor unit side to an outdoor unit side, that is aimed at being provided, has been disclosed.

Solution to Problem

An air-conditioning apparatus according to an embodiment of the present disclosure includes a refrigeration circuit where a compressor, a flow passage switching device, a heat-source-side heat exchanger, an expansion device, a load-side heat exchanger, and an accumulator are connected by pipes, the compressor being configured to compress and discharge refrigerant, the flow passage switching device being provided on a discharge port of the compressor and configured to switch a flow of the refrigerant, the expansion device being configured to decompress the refrigerant, the load-side heat exchanger being configured to condition air inside a room, the accumulator being provided on a suction port of the compressor and configured to store liquid refrigerant; a first shut-off device provided on a pipe connecting the heat-source-side heat exchanger and the expansion device; a leakage detection device configured to detect refrigerant leakage inside the room; and a controller configured to switch from a normal operation to a refrigerant recovery operation and perform the refrigerant recovery operation, in a case where refrigerant leakage is detected by the leakage detection device, where the controller controls switching of a connection state of the flow passage switching device between a first connection state in which the discharge port of the compressor is connected to the heat-source-side heat exchanger, and the suction port of the compressor is connected to the load-side heat exchanger through the accumulator, and a second connection state in which the discharge port of the compressor is connected to the load-side heat exchanger, and the suction port of the compressor is connected to the heat-source-side heat exchanger through the accumulator, and performs control to perform, at the time of the refrigerant recovery operation, a first operation of closing the first shut-off device, bringing the connection state of the flow passage switching device into the first connection state, and recovering the refrigerant from the load-side heat exchanger into the accumulator and the heat-source-side heat exchanger by driving of the compressor, and a second operation, performed after the first operation, of switching the connection state of the flow passage switching device to the second connection state in a state where the compressor is being driven, and moving the refrigerant that is condensed at the heat-source-side heat exchanger to the accumulator.

Advantageous Effects of Invention

With the air-conditioning apparatus of the embodiment of the present disclosure, switching from the first operation to the second operation may be performed while suppressing a surge in a suction pressure that is caused by switching of a refrigerant passage, and thus, liquid refrigerant that is condensed at the heat-source-side heat exchanger may be moved to the accumulator through the flow passage switching device. Accordingly, compared to a traditional case where the liquid refrigerant is moved through a bypass pipe, the liquid refrigerant may be moved in a shorter period of time, and refrigerant at the load-side heat exchanger may be efficiently recovered into the heat-source-side heat exchanger and the accumulator.

DESCRIPTION OF EMBODIMENTS

Embodiment 1

Air-Conditioning Apparatus

Figure 1:
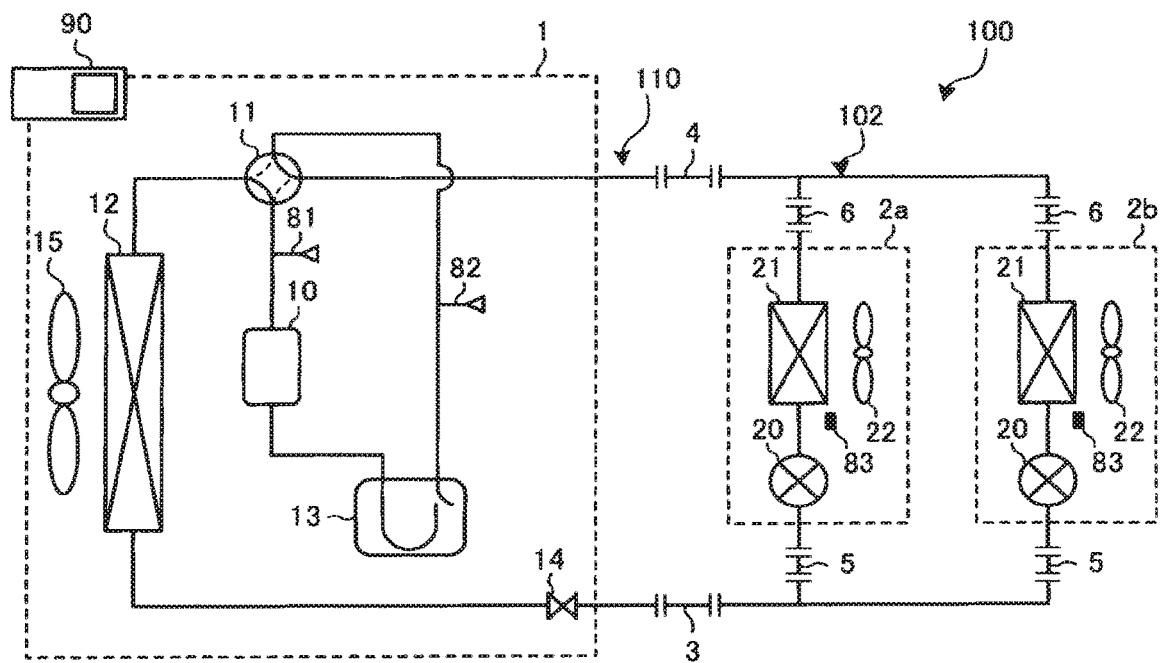
FIG. 1 is a diagram schematically showing an example of a circuit configuration of an air-conditioning apparatus according to Embodiment 1 of the present disclosure.

FIG. 1 is a diagram schematically showing an example of a circuit configuration of an air-conditioning apparatus according to Embodiment 1 of the present disclosure. An air-conditioning apparatus 100 includes a refrigerant circuit 110, and the refrigerant circuit 110 includes an outdoor unit 1 and two indoor units 2a, 2b being connected by a liquid main pipe 3, a main gas pipe 4, two liquid branch pipes 5, and two branch gas pipes 6. The liquid branch pipes 5 connect the liquid main pipe 3 and the respective indoor units 2a, 2b, and the branch gas pipes 6 connect the main gas pipe 4 and the respective indoor units 2a, 2b.

Outdoor Unit

For example, the outdoor unit 1 that is installed outside a room, and disposes of or supplies heat generated by air-conditioning. The outdoor unit 1 includes a compressor 10, a flow passage switching device 11, a heat-source-side heat exchanger 12, an accumulator 13, a first shut-off device 14 and other components, and these components are connected by pipes. The outdoor unit 1 further includes a heat-source-side fan 15 configured to send air to the heat-source-side heat exchanger 12.

The compressor 10 suctions refrigerant and compresses the refrigerant into a high-temperature, high-pressure state, and the compressor 10 is an inverter compressor, the capacity of which can be controlled, for example. As the compressor 10, one that has a low-pressure shell structure including a compression chamber inside a sealed container, in which inside of the sealed container is made a low-pressure refrigerant pressure atmosphere, and low-pressure refrigerant inside the sealed container is suctioned and compressed, may preferably be used.

The flow passage switching device 11 is a four-way valve, for example, and switches between a refrigerant passage in a heating operation mode and a refrigerant passage in a cooling operation mode. In the cooling operation mode, a discharge port of the compressor 10 is connected to the heat-source-side heat exchanger 12, and in the heating operation mode, a suction port of the compressor 10 is connected to the heat-source-side heat exchanger 12 through the accumulator 13. In the following, a connection state of the flow passage switching device 11 in the cooling operation mode will be referred to as a first connection state, and a connection state of the flow passage switching device 11 in the heating operation mode will be referred to as a second connection state.

The heat-source-side heat exchanger 12 functions as a condenser or a gas cooler in the cooling operation mode, and functions as an evaporator in the heating operation mode, and causes heat to be transferred between refrigerant and air supplied from the heat-source-side fan 15. The accumulator 13 is provided at the suction port of the compressor 10, and stores surplus refrigerant the amount of which corresponds to the difference between the amount of the refrigerant that flows during the heating operation mode and the amount of the refrigerant that flows during the cooling operation mode, or the amount of which corresponds to the difference between the amount of the refrigerant that flows after a transient change of the operation and the amount of the refrigerant that flows before the transient change of the operation.

The first shut-off device 14 is provided on a downstream side of the heat-source-side heat exchanger 12 relative to a flow direction of refrigerant in the cooling operation mode, and is a solenoid valve, opening/closing of which can be controlled, for example. When closed, the first shut-off device 14 shuts off flow of refrigerant between the outdoor unit 1 and each of the indoor units 2a, 2b through the liquid main pipe 3. Additionally, the first shut-off device 14 may be an electronic expansion valve, an opening degree of which can be variably controlled, for example.

Moreover, the outdoor unit 1 includes a discharge pressure sensor 81 and a suction pressure sensor 82. The discharge pressure sensor 81 detects a pressure of refrigerant on the discharge port of the compressor 10, or in other words, a discharge pressure. The suction pressure sensor 82 detects a pressure of refrigerant on the suction port of the compressor 10, or in other words, a suction pressure.

Indoor Unit

The indoor units 2a, 2b are each installed inside a room, for example, and supplies conditioned air into the room. In the following, a description will be given only on a configuration of the indoor unit 2a, presuming that the indoor unit 2a and the indoor unit 2b have a same configuration. The indoor unit 2a includes an expansion device 20, a load-side heat exchanger 21, a load-side fan 22 and other components, and the expansion device 20 and the load-side heat exchanger 21 are connected by a pipe. The indoor unit 2a further includes a leakage detection device 83, a temperature sensor (not shown), and other components.

The expansion device 20 includes a function of a pressure reducing valve or an expansion valve configured to decompress and expand refrigerant. For example, the expansion device 20 is an electronic expansion valve, an opening degree of which can be variably controlled. The expansion device 20 is provided on an upstream side of the load-side heat exchanger 21 relative to the flow direction of refrigerant in the cooling operation mode.

The load-side heat exchanger 21 generates air for heating or air for cooling to be supplied into an indoor space, by causing heat to be exchanged between air and refrigerant. Indoor air is sent to the load-side heat exchanger 21 by the load-side fan 22. The load-side heat exchanger 21 is connected to the suction port of the compressor 10 through the accumulator 13 when the flow passage switching device 11 is in the first connection state, and is connected to the discharge port of the compressor 10 when the flow passage switching device 11 is in the second connection state.

The leakage detection device 83 includes a refrigerant concentration sensor, for example, and detects presence or absence of refrigerant leakage inside or around the indoor unit 2a. Alternatively, the leakage detection device 83 may measure the refrigerant concentration, and a controller 90 may determine presence or absence of refrigerant leakage. The temperature sensor detects an indoor temperature.

Controller

The controller 90 includes an analog circuit, a digital circuit, a CPU, or two or more among these components, for example, and controls each unit of the air-conditioning apparatus 100. Furthermore, the controller 90 includes a memory and a timer. The controller 90 performs an operation mode on the basis of detection information detected by various sensors, such as the temperature sensor, the discharge pressure sensor 81 and the suction pressure sensor 82, a command input by a remote control or the like, and setting values set in advance, for example, and controls each actuator.

The air-conditioning apparatus 100 performs cooling operation or heating operation by the indoor unit 2a, 2b on the basis of an instruction from the respective indoor unit 2a, 2b. Operation modes of the air-conditioning apparatus 100 include a cooling operation mode in which all the driving indoor units 2a, 2b perform cooling operation, and a heating operation mode in which all the driving indoor units 2a, 2b perform heating operation. Furthermore, in a case where refrigerant leakage is detected by at least one of the leakage detection devices 83 installed in the indoor units 2a, 2b, the air-conditioning apparatus 100 performs a refrigerant recovery operation mode to reduce the amount of leakage of refrigerant into the room. In the refrigerant recovery operation mode, a first operation of recovering refrigerant from a load-side circuit 102 into the outdoor unit 1, a second operation of moving refrigerant from the heat-source-side heat exchanger 12 to the accumulator 13, and a third operation of shutting off a flow of refrigerant from the outdoor unit 1 to the load-side circuit 102 are performed.

Here, the load-side circuit 102 is a circuit including the liquid main pipe 3, the liquid branch pipes 5, the load-side heat exchangers 21, the branch gas pipes 6, and the main gas pipe 4. Moreover, to prevent liquid refrigerant from overflowing from the accumulator 13 to be suctioned into the compressor 10 in the refrigerant recovery operation mode, a capacity of the accumulator 13 may preferably be set greater than a total volume of liquid refrigerant present in the load-side circuit 102.

A period of time required for the refrigerant recovery operation mode is about 5 minutes in winter and 20 minutes in summer for a 20-horsepower air-conditioning system for a building, for example. When the refrigerant recovery operation mode is started, the load-side circuit 102 immediately reaches a low pressure, and a leakage rate from a leakage portion is reduced. For example, in a case where a leakage portion is a leak hole of about 0.1 mm generated by corrosion of a pipe, a leakage rate that is about 20 kg/h before execution of the refrigerant recovery operation mode is reduced to about 0.5 kg/h after the refrigerant recovery operation mode is performed. Accordingly, the amount of leakage during the refrigerant recovery operation mode is about 0.2 kg.

Figure 2:
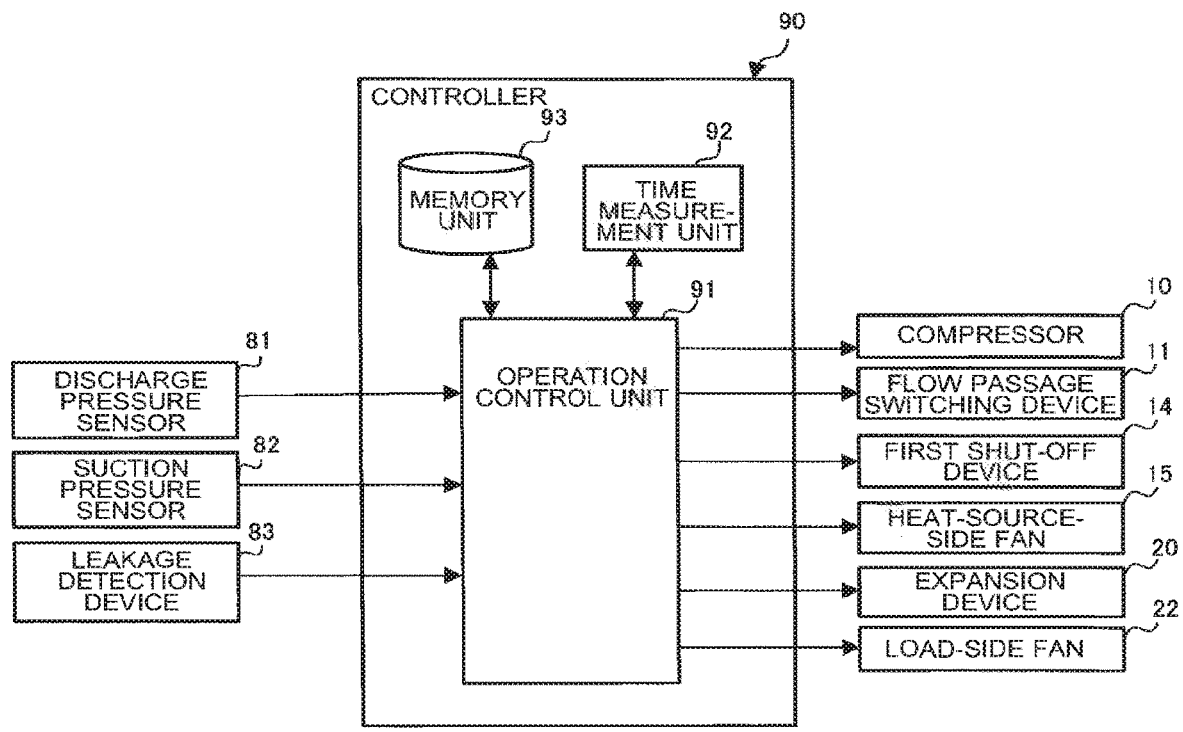
FIG. 2 is a functional block diagram showing functions of a controller according to Embodiment 1 of the present disclosure.

FIG. 2 is a functional block diagram showing functions of the controller according to Embodiment 1 of the present disclosure. The controller 90 includes an operation control unit 91, a time measurement unit 92, and a memory unit 93. The operation control unit 91 controls operation of the air-conditioning apparatus 100 by controlling each actuator. The storage unit 93 stores various control values for use in controlling the actuators, setting values for use in switching the operation mode and also switching the operation, and other values. The time measurement unit 92 includes a timer function, and measures a time and notifies the operation control unit 91 of the time.

Pieces of information including a command from a remote control, an indoor temperature detected by each temperature sensor, a discharge pressure Pd detected by the discharge pressure sensor 81, a suction pressure Ps detected by the suction pressure sensor 82, and refrigerant leakage information detected by the leakage detection device 83 are input to the operation control unit 91. The operation control unit 91 performs each operation mode on the basis of the input information, setting values and the like. The operation control unit 91 controls an operating frequency of the compressor 10, switching the connection state of the flow passage switching device 11, opening/closing of the first shut-off device 14, a rotation speed of the heat-source-side fan 15, an opening degree of the expansion device 20, and a rotation speed of the load-side fan 22, for example.

Control values stored in the memory unit 93 include an upper limit value and a lower limit value of a frequency of the compressor 10, a maximum value of the rotation speed of the heat-source-side fan 15, and a maximum value of the rotation speed of each load-side fan 22, for example. These control values are set in advance for a normal operation mode and the refrigerant recovery operation mode.

Specifically, the upper limit value of the frequency of the compressor 10, the maximum value of the rotation speed of the heat-source-side fan 15, and the maximum value of the rotation speed of each load-side fan 22 for the refrigerant recovery operation mode are set to values greater than values set for the normal operation mode. When such control values are used, condensation at the heat-source-side heat exchanger 12 and evaporation at each load-side heat exchanger 21 may be promoted in the refrigerant recovery operation mode, and a refrigerant recovery speed may be increased. Furthermore, due to promotion of condensation at the heat-source-side heat exchanger 12, refrigerant recovery may be performed even at the time of the year or in a region where an outside temperature is high and condensation does not easily occur.

Furthermore, the lower limit value of the frequency of the compressor 10 for the refrigerant recovery operation mode is set to a value smaller than the lower limit value set for the normal operation mode. When such a control value is used, refrigerant recovery may be performed even at the time of the year or in a region where an outside temperature is high and condensation does not easily occur, by continuing operation while reducing a flow rate of the compressor 10 to or below a condensation rate of the heat-source-side heat exchanger 12.

Furthermore, setting values stored in the memory unit 93 include a discharge pressure threshold Pdt, a suction pressure threshold Pst, a lowest operating pressure PL, and a set time Ts, for example. The discharge pressure threshold Pdt is set in advance as a discharge pressure when the heat-source-side heat exchanger 12 is filled with liquid refrigerant, and is used as a condition for starting the second operation in the refrigerant recovery operation mode. The suction pressure threshold Pst is set in advance as a suction pressure when there is no refrigerant in the load-side circuit 102, and is used as a condition for starting the third operation in the refrigerant recovery operation mode. The set time Ts is set in advance as a time when the second operation is performed, and is used as one of conditions for ending the second operation. The lowest operating pressure PL is a lower limit pressure at which the flow passage switching device 11 operates, and is used as one of the conditions for ending the second operation.

The cooling operation mode and the heating operation mode in the normal operation mode will be described in detail.

Cooling Operation Mode

Figure 3:
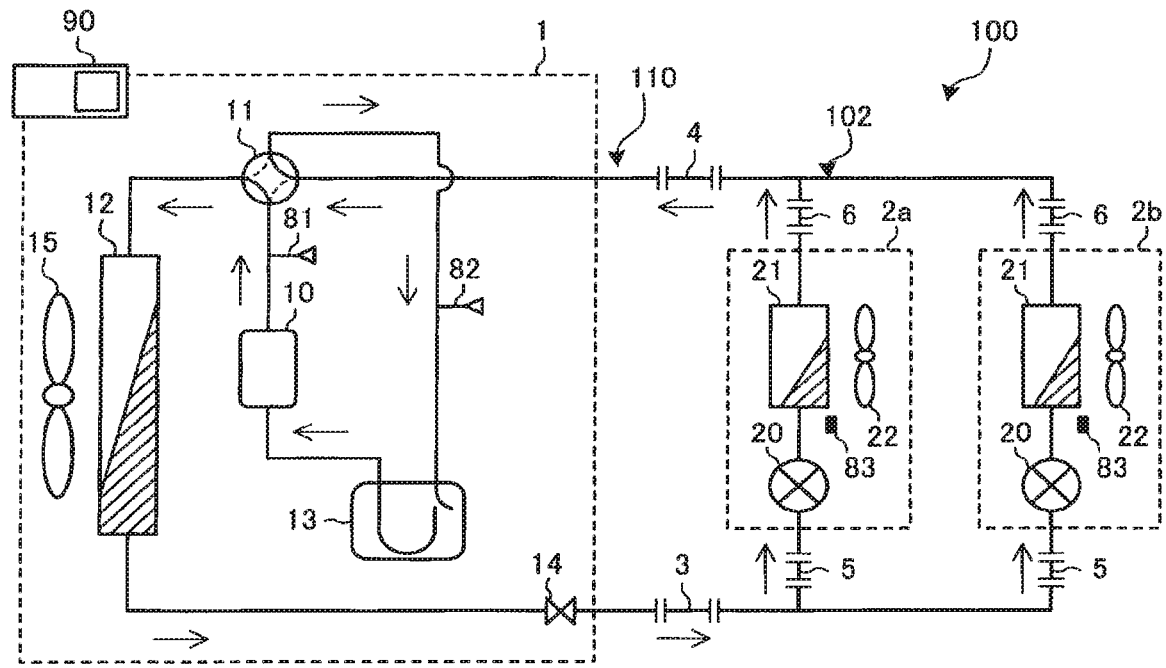
FIG. 3 is a diagram illustrating an example of flow of refrigerant in a cooling operation mode of the air-conditioning apparatus in FIG. 1.

FIG. 3 is a diagram illustrating an example of flow of refrigerant in the cooling operation mode of the air-conditioning apparatus in FIG. 1. The cooling operation mode when a cooling load is generated at each load-side heat exchanger 21 will be described with reference to FIG. 3. In FIG. 3, a flow direction of refrigerant flowing through the refrigerant circuit 110 is indicated by solid arrows, and amounts of liquid refrigerant present inside the heat-source-side heat exchanger 12 and the load-side heat exchangers 21 are indicated by diagonal lines.

In the cooling operation mode, the controller 90 drives the compressor 10, the heat-source-side fan 15, and each load-side fan 22, and performs control to bring the connection state of the flow passage switching device 11 into the first connection state, to open each expansion device 20, and to fully open the first shut-off device 14. The compressor 10 suctions and compresses low-temperature, low-pressure refrigerant, and discharges high-temperature, high-pressure refrigerant. The high-temperature, high-pressure refrigerant discharged from the compressor 10 flows into the heat-source-side heat exchanger 12 through the flow passage switching device 11. The refrigerant flowing into the heat-source-side heat exchanger 12 is condensed at the heat-source-side heat exchanger 12 through heat exchange with outside air supplied by the heat-source-side fan 15. The refrigerant condensed at the heat-source-side heat exchanger 12 flows through the first shut-off device 14 and out of the outdoor unit 1, and then, flows into each indoor unit 2a, 2b through the liquid main pipe 3 and the respective liquid branch pipe 5.

The refrigerant flowing into each indoor unit 2a, 2b is expanded at the respective expansion device 20, and flows into the respective load-side heat exchanger 21. The refrigerant flowing into each load-side heat exchanger 21 evaporates at the load-side heat exchanger 21 while removing heat from the indoor air and cooling the indoor space. The refrigerant evaporated at each load-side heat exchanger 21 flows out of the respective indoor unit 2a, 2b, and flows into the outdoor unit 1 through the respective branch gas pipe 6 and the main gas pipe 4. The refrigerant flowing into the outdoor unit 1 flows through the flow passage switching device 11, and is suctioned again into the compressor 10 through the accumulator 13.

A distribution of refrigerant in the refrigerant circuit 110 will be described. The refrigerant is present inside the refrigerant circuit 110 in a state of gas or liquid. Liquid has a higher concentration than gas, and thus, a refrigerant is distributed in a large amount at a part where the refrigerant is present in the liquid state. Accordingly, in the cooling operation mode, refrigerant is distributed in a large amount in the heat-source-side heat exchanger 12 where the refrigerant is condensed, the liquid main pipe 3 and each liquid branch pipe 5 where the liquid refrigerant flows through, and each load-side heat exchanger 21 where the refrigerant evaporates.

Heating Operation Mode

Figure 4:
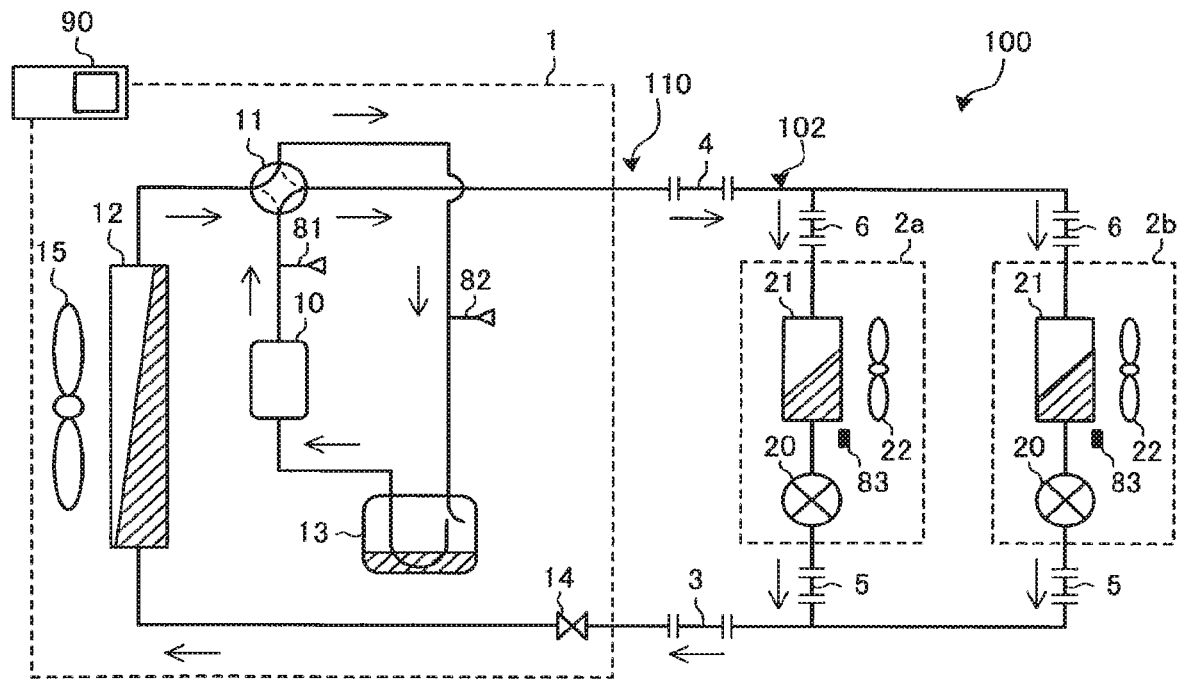
FIG. 4 is a diagram illustrating an example of flow of refrigerant in a heating operation mode of the air-conditioning apparatus in FIG. 1.

FIG. 4 is a diagram illustrating an example of flow of refrigerant in the heating operation mode of the air-conditioning apparatus in FIG. 1. The heating operation mode when a heating load is generated at each load-side heat exchanger 21 will be described with reference to FIG. 4. In FIG. 4, a flow direction of refrigerant flowing through the refrigerant circuit 110 is indicated by solid arrows, and amounts of liquid refrigerant present inside the heat-source-side heat exchanger 12, the accumulator 13, and the load-side heat exchangers 21 are indicated by diagonal lines.

In the heating operation mode, the controller 90 drives the compressor 10, the heat-source-side fan 15, and each load-side fan 22, and performs control to bring the connection state of the flow passage switching device 11 into the second connection state, to open each expansion device 20, and to fully open the first shut-off device 14. The compressor 10 suctions and compresses low-temperature, low-pressure refrigerant, and discharges high-temperature, high-pressure refrigerant. The high-temperature, high-pressure refrigerant discharged from the compressor 10 flows through the flow passage switching device 11 and out of the outdoor unit 1. The high-temperature, high-pressure refrigerant flowing out of the outdoor unit 1 flows through the main gas pipe 4 and each branch gas pipe 6, and flows into the load-side heat exchanger 21 of each indoor unit 2a, 2b.

The refrigerant flowing into each load-side heat exchanger 21 is condensed at the load-side heat exchanger 21 by transferring heat to the indoor air and heating the indoor space. The refrigerant condensed at each load-side heat exchanger 21 is expanded at the respective expansion device 20, and flows out of the respective indoor unit 2a, 2b. The refrigerant flowing out of each indoor unit 2a, 2b flows through the respective liquid branch pipe 5 and the liquid main pipe 3, and flows into the outdoor unit 1. The refrigerant flowing into the outdoor unit 1 flows through the first shut-off device 14 and into the heat-source-side heat exchanger 12, and evaporates at the heat-source-side heat exchanger 12 by exchanging heat with the outside air. The refrigerant evaporated at the heat-source-side heat exchanger 12 flows through the flow passage switching device 11, and is suctioned again into the compressor 10 through the accumulator 13.

A distribution of refrigerant in the refrigerant circuit 110 will be described. In the heating operation mode, the refrigerant is distributed in a large amount in each load-side heat exchanger 21 where the refrigerant is condensed, the liquid main pipe 3 and each liquid branch pipe 5 where the liquid refrigerant flows through, and the heat-source-side heat exchanger 12 where the refrigerant evaporates.

Next, the first operation, the second operation and the third operation in the refrigerant recovery operation mode, and switching between the operations will be described in detail.

First Operation

Figure 5:
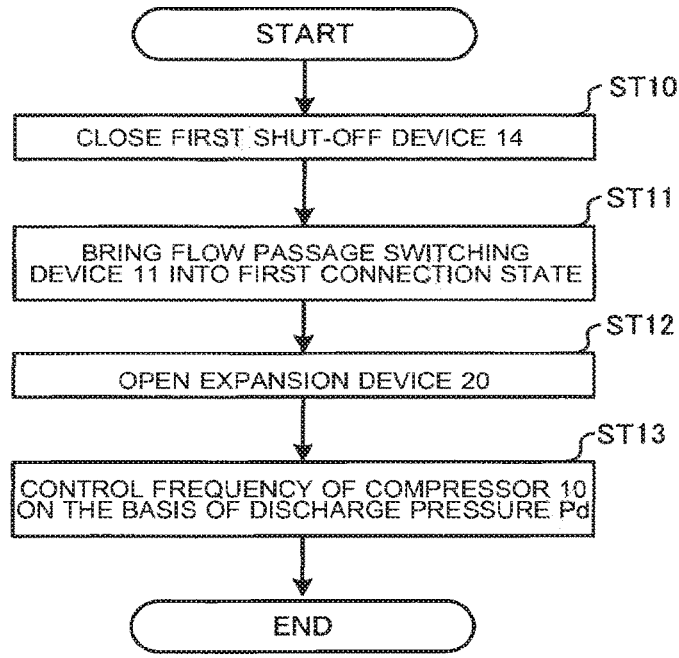
FIG. 5 is a diagram illustrating a first operation of the air-conditioning apparatus in FIG. 1.
Figure 6:
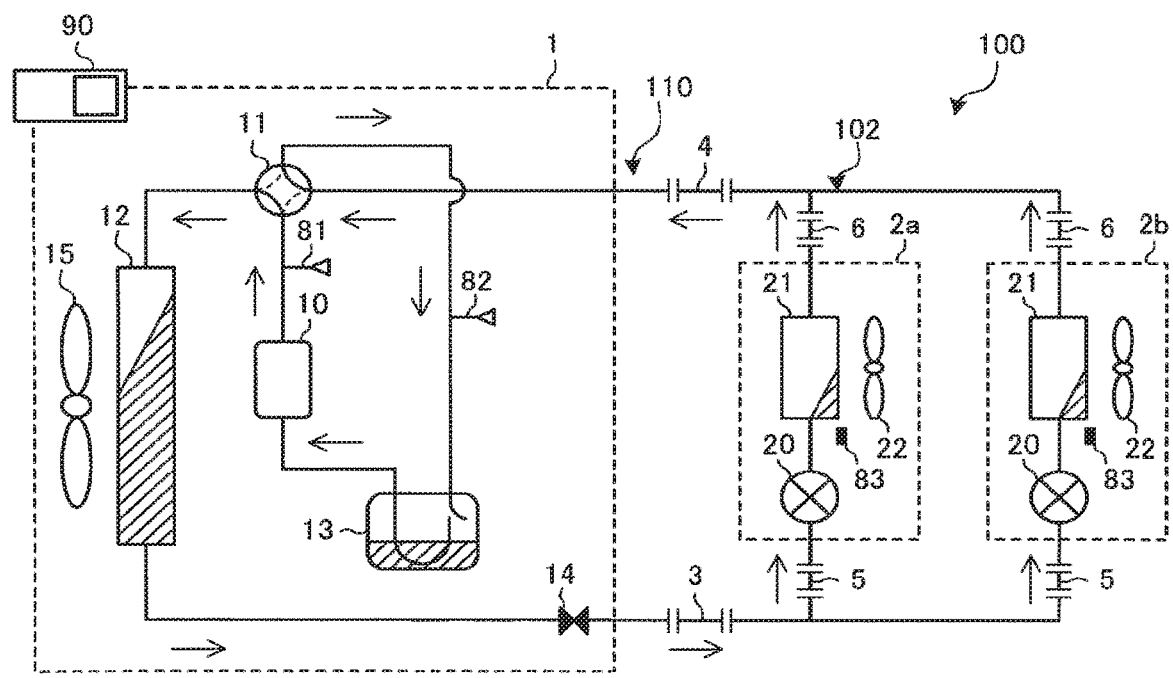
FIG. 6 is a diagram illustrating an example of flow of refrigerant at the time of the first operation of the air-conditioning apparatus in FIG. 1.

FIG. 5 is a diagram illustrating the first operation of the air-conditioning apparatus in FIG. 1. FIG. 6 is a diagram illustrating an example of flow of refrigerant at the time of the first operation of the air-conditioning apparatus in FIG. 1. The first operation will be described in detail with reference to FIGS. 5 and 6. In FIG. 6, a flow direction of refrigerant flowing through the refrigerant circuit 110 is indicated by solid arrows, and amounts of liquid refrigerant present inside the heat-source-side heat exchanger 12, the accumulator 13, and the load-side heat exchangers 21 are indicated by diagonal lines.

First, control of each unit at the time of the first operation will be described. The controller 90 performs control to close the first shut-off device 14 (step ST10), to bring the connection state of the flow passage switching device 11 into the first connection state (step ST11), and to open each expansion device 20 (step ST12). Furthermore, the controller 90 controls the operating frequency of the compressor 10 on the basis of the discharge pressure Pd detected by the discharge pressure sensor 81 (step ST13). Specifically, the operating frequency is controlled such that the discharge pressure Pd reaches a target value that is set in advance.

Next, the flow of refrigerant at the time of the first operation will be described.

As shown in FIG. 6, the compressor 10 suctions and compresses low-temperature, low-pressure refrigerant, and discharges high-temperature, high-pressure refrigerant. The high-temperature, high-pressure refrigerant discharged from the compressor 10 flows through the flow passage switching device 11 and into the heat-source-side heat exchanger 12, and is condensed at the heat-source-side heat exchanger 12 by exchanging heat with outside air supplied by the heat-source-side fan 15. The refrigerant condensed at the heat-source-side heat exchanger 12 is stored in the heat-source-side heat exchanger 12. The refrigerant present in each indoor unit 2a, 2b evaporates while removing heat from the indoor air at the respective load-side heat exchanger 21. The refrigerant flowing out of each load-side heat exchanger 21 flows through the respective branch gas pipe 6 and the main gas pipe 4 and into the outdoor unit 1. The refrigerant flowing into the outdoor unit 1 flows through the flow passage switching device 11 and the accumulator 13, and is suctioned again into the compressor 10 and then compressed. The refrigerant present in the liquid main pipe 3 and each liquid branch pipe 5 flows through the respective expansion device 20 and into the respective load-side heat exchanger 21, and thereafter flows in the same manner as the refrigerant present in each indoor unit 2a, 2b.

Next, the distribution of refrigerant in the refrigerant circuit 110 will be described. When the first operation is performed, the refrigerant is distributed in a large amount in the heat-source-side heat exchanger 12 where the refrigerant is condensed, and the accumulator 13 where the liquid refrigerant flowing in from the load-side circuit 102 is stored.

Now, switching from the first operation to the second operation or the third operation will be described. In the flow direction of refrigerant at the time of the first operation, the downstream side of the heat-source-side heat exchanger 12 is shut off from the load-side circuit 102 by the first shut-off device 14, and thus, when the refrigerant flow rate of the compressor 10 exceeds the condensation rate at the heat-source-side heat exchanger 12, the discharge pressure is increased. Then, when the heat-source-side heat exchanger 12 is nearly liquid-filled, the condensation rate at the heat-source-side heat exchanger 12 is significantly reduced, and thus, the discharge pressure is increased even when the compressor 10 is driven at a lowest frequency. The controller 90 performs control to switch to the second operation, when the discharge pressure Pd detected by the discharge pressure sensor 81 exceeds the discharge pressure threshold Pdt.

Furthermore, the refrigerant present in each indoor unit 2a, 2b, the liquid main pipe 3, and each liquid branch pipe 5 is reduced over a period of time from start of recovery of the refrigerant by the first operation, and thus, the suction pressure is reduced. The controller 90 performs control to switch to the third operation, when the suction pressure Ps detected by the suction pressure sensor 82 falls below the suction pressure threshold Pst.

Second Operation

Figure 7:
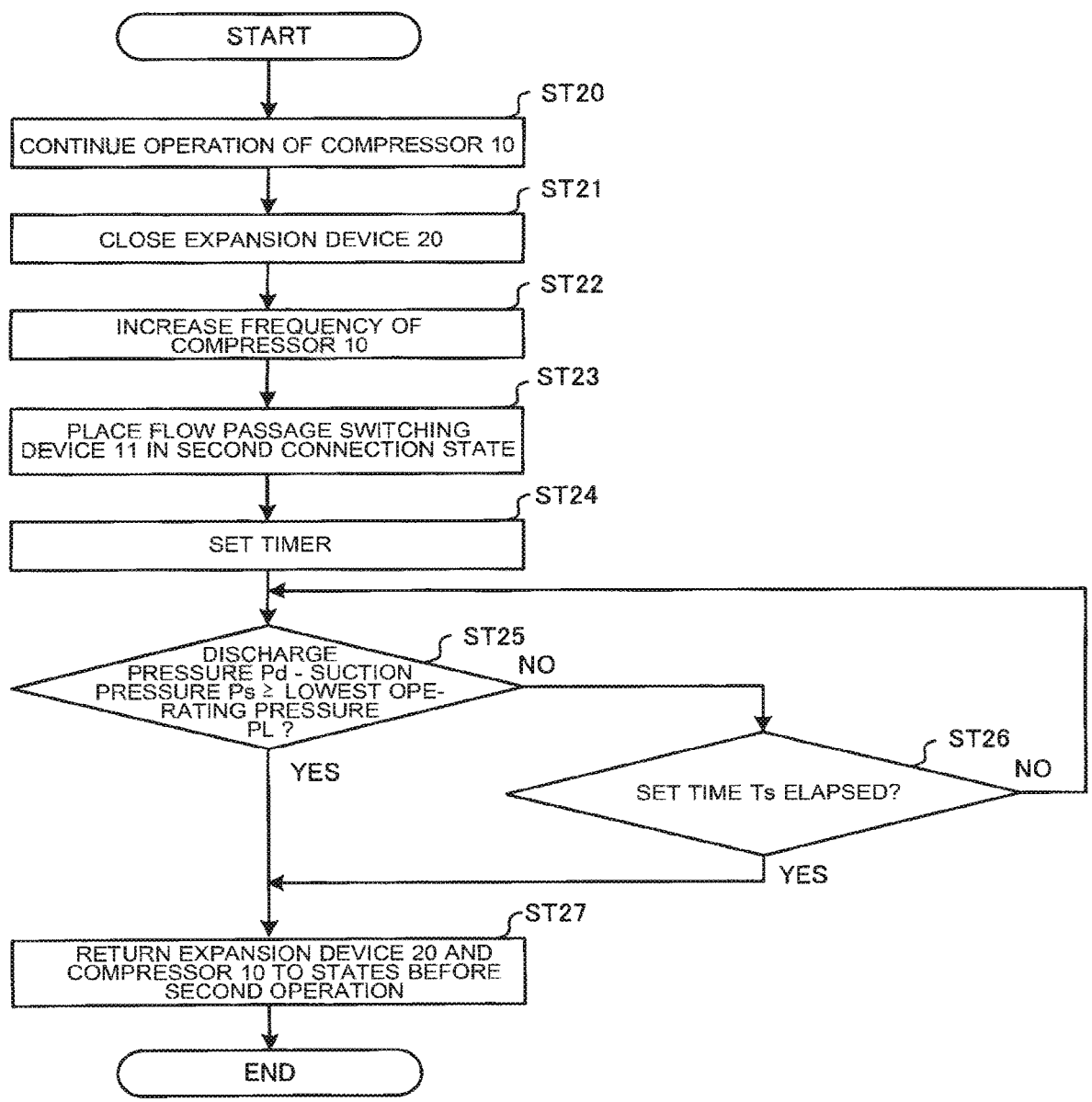
FIG. 7 is a diagram illustrating a second operation of the air-conditioning apparatus in FIG. 1.
Figure 8:
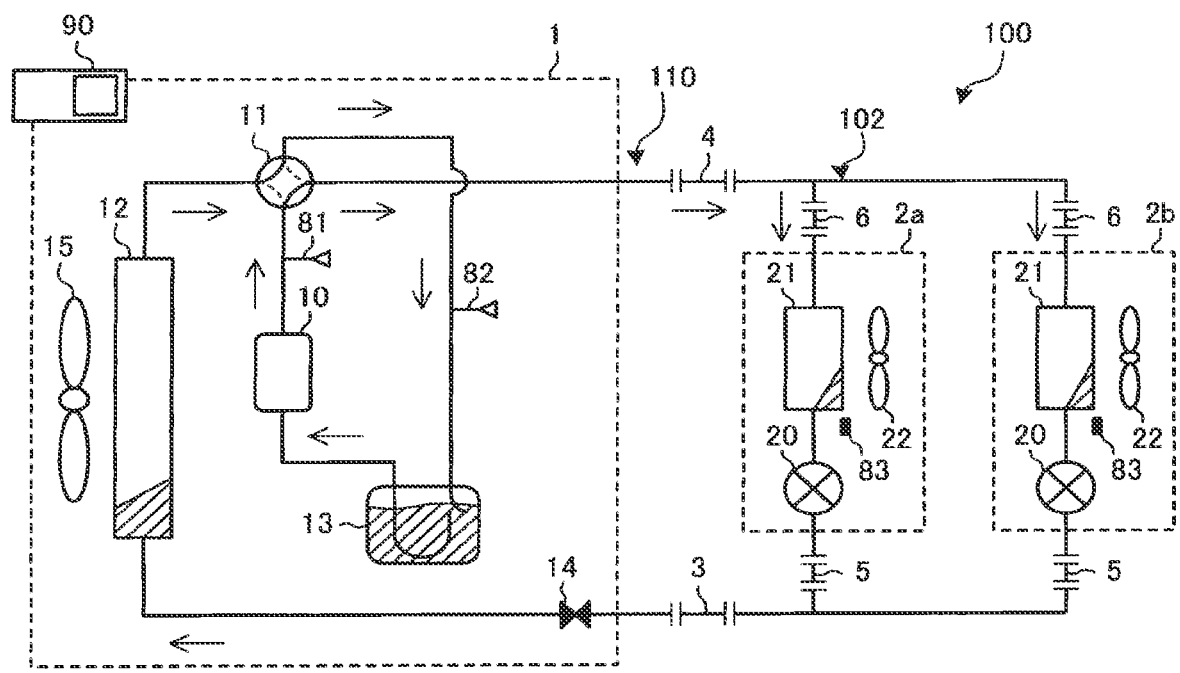
FIG. 8 is a diagram illustrating an example of flow of refrigerant at the time of the second operation of the air-conditioning apparatus in FIG. 1.

FIG. 7 is a diagram illustrating the second operation of the air-conditioning apparatus in FIG. 1. FIG. 8 is a diagram illustrating an example flow of refrigerant at the time of the second operation of the air-conditioning apparatus in FIG. 1. The second operation will be described in detail with reference to FIGS. 7 and 8. In FIG. 8, a flow direction of refrigerant flowing through the refrigerant circuit 110 is indicated by solid arrows, and amounts of liquid refrigerant present inside the heat-source-side heat exchanger 12, the accumulator 13, and the load-side heat exchangers 21 are indicated by diagonal lines.

First, control of each unit at the time of the second operation will be described.

In a state where operation of the compressor 10 is continued (step ST20), the controller 90 performs a throttle operation of closing each expansion device 20 (step ST21). Next, the controller 90 performs an acceleration operation of increasing the frequency of the compressor 10 (step ST22), and then switches the connection state of the flow passage switching device 11 to the second connection state (step ST23). At the time of switching the connection state of the flow passage switching device 11, the controller 90 sets the set time Ts in the time measurement unit 92 (step ST24).

Next, the controller 90 determines whether a condition for ending the second operation is satisfied. The controller 90 determines whether a difference ΔP between the discharge pressure Pd detected by the discharge pressure sensor 81 and the suction pressure Ps detected by the suction pressure sensor 82 is equal to or greater than the lowest operating pressure PL of the flow passage switching device 11 (step ST25). In the case where the difference ΔP between the discharge pressure Pd and the suction pressure Ps is smaller than the lowest operating pressure PL (step ST25: NO), the controller 90 further determines whether the set time Ts has elapsed since the connection state of the flow passage switching device 11 is switched to the second connection state (step ST26). Here, a lapse of the set time Ts is determined in a case where the lapse of the set time Ts is notified of by the time measurement unit 92 (step ST26: YES). In the case where the set time Ts has not elapsed since the connection state of the flow passage switching device 11 is switched to the second connection state (step ST26: NO), the processes in steps ST25 and ST26 are repeated.

Then, when the difference ΔP reaches or exceeds the lowest operating pressure PL in step ST25 (step ST25: YES), or the set time Ts elapses in step ST26 (step ST26: YES), the controller 90 performs the process in step ST27. That is, the controller 90 returns the opening degree of each expansion device 20 and the operating frequency of the compressor 10 to the states before start of the second operation. In a case where the acceleration operation in step ST22 is performed, control is performed in step ST27 to reduce the operating frequency of the compressor 10. By performing steps ST25 and ST26 as the conditions for ending the second operation, and by performing the process in step ST27 in a case where one of the conditions is satisfied, pressure fluctuation may be prevented in a case where there is a time delay in the pressure fluctuation, such as in a case where a pipe is long. Additionally, in step ST25, whether the discharge pressure Pd is equal to or greater than the suction pressure Ps may alternatively be determined.

Next, the flow of refrigerant at the time of the second operation will be described. When the connection state of the flow passage switching device 11 is switched to the second connection state, liquid refrigerant in the heat-source-side heat exchanger 12 flows through the flow passage switching device 11 and moves to the accumulator 13, due to a pressure difference between the high-pressure heat-source-side heat exchanger 12 and the low-pressure accumulator 13. At this time, the moving liquid refrigerant does not pass through a flow resistance such as a narrow bypass pipe or a valve, and movement is completed in a short period of time of less than 30 seconds, for example. For its part, gas refrigerant in the heat-source-side heat exchanger 12 passes through the accumulator 13, and flows into the compressor 10. The gas refrigerant discharged from the compressor 10 flows into each load-side heat exchanger 21 through the flow passage switching device 11, the main gas pipe 4, and the respective branch gas pipe 6. Since the expansion devices 20 are closed, refrigerant does not move to the liquid branch pipes 5 and the liquid main pipe 3.

At the time of switching the connection state of the flow passage switching device 11 to the second connection state, the discharge port of the compressor 10 is connected to the low-pressure main gas pipe 4 and each indoor unit 2a, 2b, and the like, and the high-pressure heat-source-side heat exchanger 12 is connected to the accumulator 13. Accordingly, in a case where the suction pressure is increased to exceed the discharge pressure due to a drastic decrease in discharge pressure and a drastic increase in suction pressure, there may be a case where the compressor 10 or the flow passage switching device 11 may stop normal operation. Here, fluctuations in the discharge pressure and the suction pressure are suppressed by reducing the pressure at the suction port of the compressor 10 and increasing the pressure at the discharge port of the compressor 10 by keeping the compressor 10 in the operating state, and by closing each expansion device 20 and increasing the pressure at the discharge port, as described above.

Next, the distribution of refrigerant in the refrigerant circuit 110 will be described. When the second operation is performed, the refrigerant is distributed in a large amount in the accumulator 13 where the liquid refrigerant flows in from the heat-source-side heat exchanger 12. During the second operation, refrigerant recovery is not performed, and the refrigerant flows from the outdoor unit 1 into each indoor unit 2a, 2b through the main gas pipe 4. However, the refrigerant that flows into each indoor unit 2a, 2b is gas refrigerant, and also, a single second operation lasts for a short time of about 30 seconds and the number of times of execution of the second operation is about 0 to 5 times, and thus, an increase in the amount of refrigerant in each indoor unit 2a, 2b by the second operation is suppressed to be small.

A description will now be given on switching from the second operation to the first operation. The controller 90 performs control to switch to the first operation, after returning each expansion device 20 and the compressor 10 to the states before start of the second operation by the process in step ST27 in FIG. 7. The first operation is performed after the second operation so that no unrecovered refrigerant remains on the load side.

Third Operation

Figure 9:
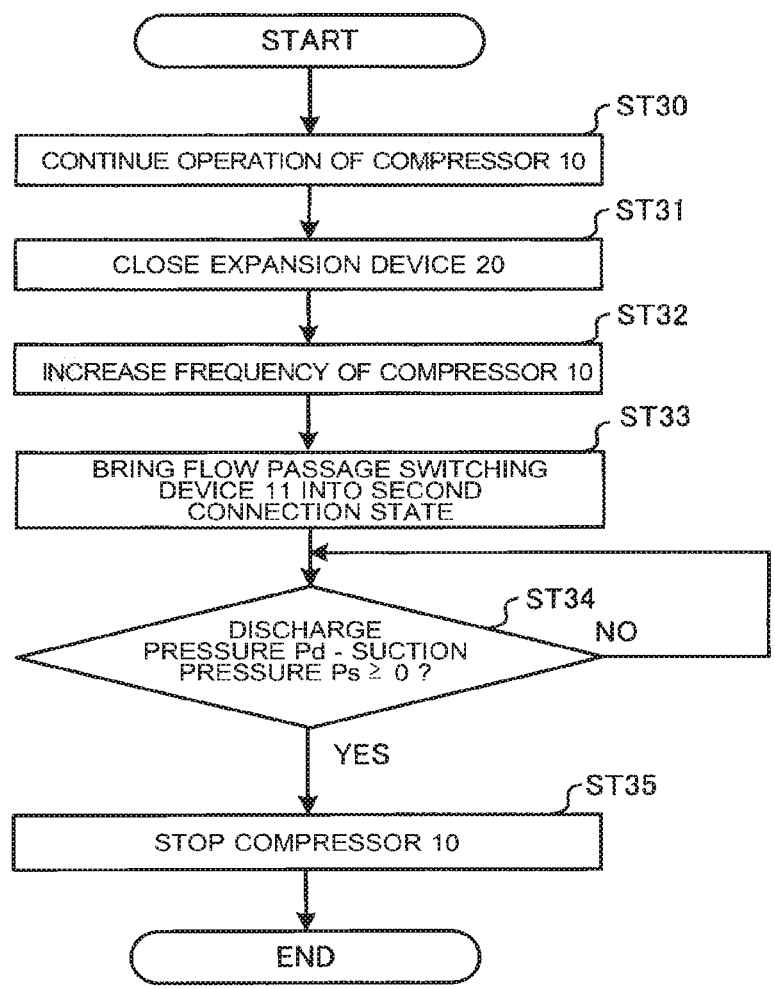
FIG. 9 is a diagram illustrating a third operation of the air-conditioning apparatus in FIG. 1.
Figure 10:
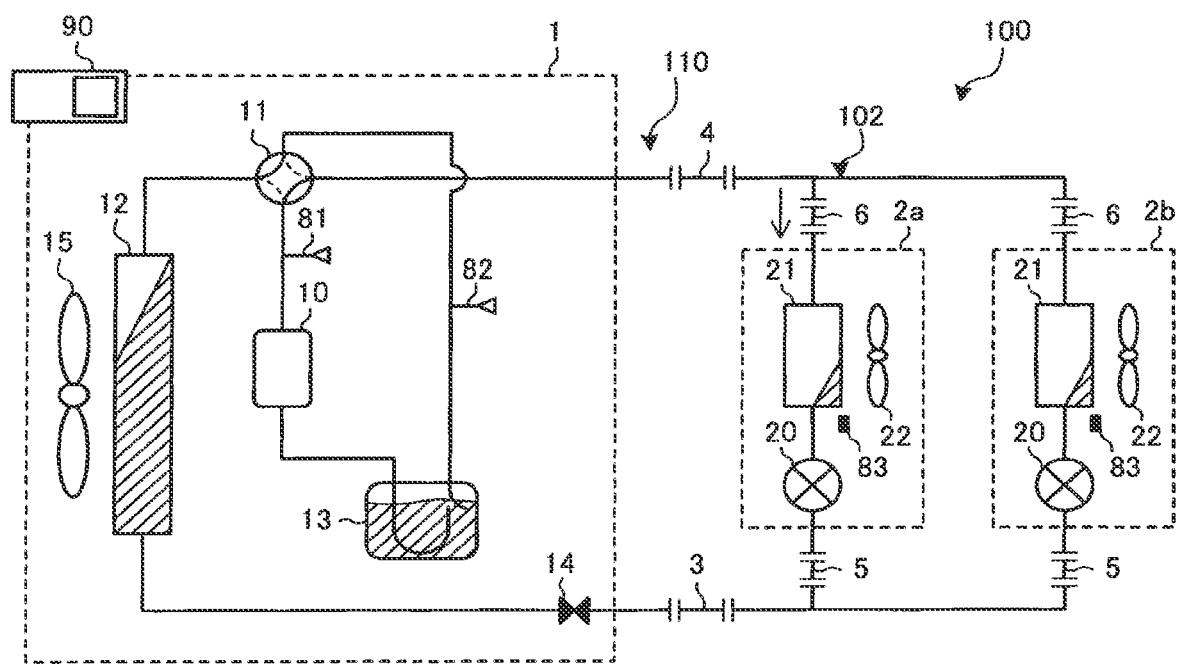
FIG. 10 is a diagram illustrating an example of flow of refrigerant at the time of the third operation of the air-conditioning apparatus in FIG. 1.

FIG. 9 is a diagram illustrating the third operation of the air-conditioning apparatus in FIG. 1. FIG. 10 is a diagram illustrating an example of flow of refrigerant at the time of the third operation of the air-conditioning apparatus in FIG. 1. The third operation will be described in detail with reference to FIGS. 9 and 10. In FIG. 10, amounts of liquid refrigerant present inside the heat-source-side heat exchanger 12, the accumulator 13, and the load-side heat exchangers 21 are indicated by diagonal lines.

The third operation is similar to the second operation described above. In a state where operation of the compressor 10 is continued (step ST30), the controller 90 closes each expansion device 20 (step ST31), performs the acceleration operation for the compressor 10 (step ST32), and brings the connection state of the flow passage switching device 11 into the second connection state (step ST33). In the third operation, control that is performed after switching the connection state of the flow passage switching device 11 to the second connection state is different from the control in the second operation. After switching the connection state of the flow passage switching device 11 to the second connection state in step ST33, the controller 90 determines whether the difference ΔP between the discharge pressure Pd and the suction pressure Ps is zero or greater (step ST34). Then, when the difference ΔP between the discharge pressure Pd and the suction pressure Ps is zero or greater (step ST34: YES), the controller 90 stops the compressor 10 (step ST35). On the other hand, in a case where the difference ΔP between the discharge pressure Pd and the suction pressure Ps is smaller than zero (step ST34: NO), the controller 90 continues operation of the compressor 10, and repeats the determination in step ST34.

Additionally, a period of time during which the third operation is executed may be used as the condition for ending the third operation, instead of the difference ΔP between the discharge pressure Pd and the suction pressure Ps. In this case, the controller 90 may set the time of the third operation in the time measurement unit 92 at the time of switching the connection state of the flow passage switching device 11 to the second connection state, and may perform control to stop the compressor 10 when the set time elapses. Additionally, after the refrigerant recovery operation mode is ended, the flow passage switching device 11 is in the second connection state, and each indoor unit 2a, 2b is separated from the outdoor unit 1 by the first shut-off device 14 and the compressor 10, and thus, the refrigerant is recovered to a pipe near the outdoor unit 1.

Figure 11:
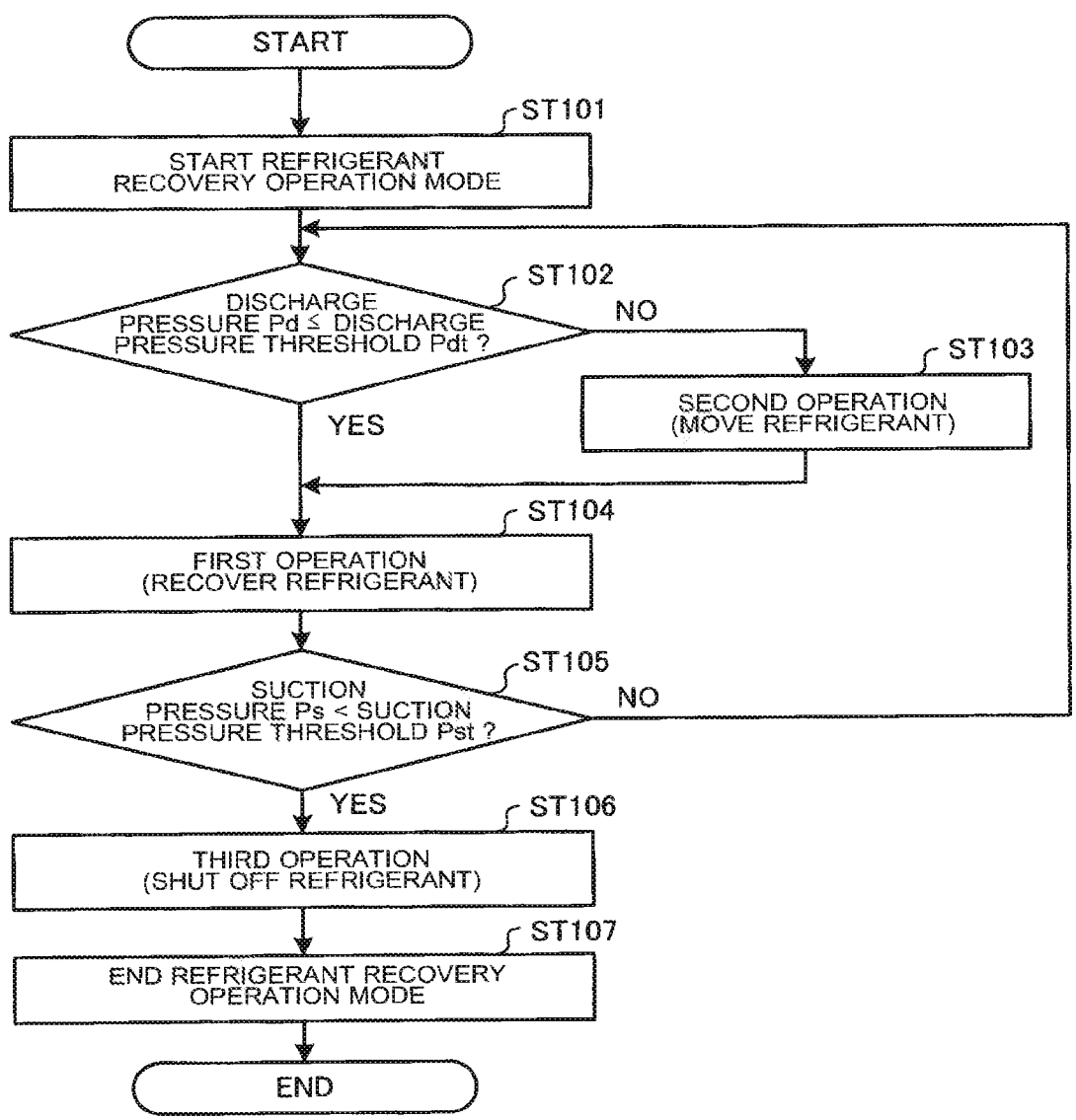
FIG. 11 is a diagram illustrating a control flow at the time of a refrigerant recovery operation mode of the air-conditioning apparatus in FIG. 1.

FIG. 11 is a diagram illustrating a control flow at the time of the refrigerant recovery operation mode of the air-conditioning apparatus in FIG. 1. In the following, a description is given on an example of a case where there is occurrence of refrigerant leakage at the load-side heat exchanger 21 of the indoor unit 2a, of the two indoor units 2a, 2b. Refrigerant leakage is detected by the leakage detection device 83 of the indoor unit 2a, and refrigerant leakage detection information is input to the controller 90. When the refrigerant leakage detection information is input to the controller 90, the controller 90 performs the control flow in FIG. 11.

The operation control unit 91 records the previous operation mode in the memory unit 93, and starts the refrigerant recovery operation mode (step ST101). After the refrigerant recovery operation mode is started, the operation control unit 91 performs control to bring the connection state of the flow passage switching device 11 into the first connection state, and to close the first shut-off device 14. That is, in the case where the previous operation mode is the cooling operation mode, the first shut-off device 14 is closed, and in the case where the previous operation mode is the heating operation mode or in a stopped state, the connection state of the flow passage switching device 11 is switched to the first connection state, and the first shut-off device 14 is closed. In a case where the heating operation mode is to be shifted to the refrigerant recovery operation mode, the operation control unit 91 performs control to reduce the operating frequency of the compressor 10 to the minimum value, and then, to switch the connection state of the flow passage switching device 11. Such switching prevents occurrence of noise caused by high-pressure refrigerant flowing into the flow passage switching device 11 from each indoor unit 2a, 2b, or occurrence of malfunction of the flow passage switching device 11.

Furthermore, when the refrigerant recovery operation mode is started, the operation control unit 91 performs control such that the heat-source-side fan 15 and each load-side fan 22 are driven at a full speed. At this time, the heat-source-side fan 15 and each load-side fan 22 are driven at rotation speeds greater than those in the normal operation mode.

Next, the operation control unit 91 determines whether the discharge pressure Pd detected by the discharge pressure sensor 81 is at or below the discharge pressure threshold Pdt (step ST102). In the case where the discharge pressure Pd is greater than the discharge pressure threshold Pdt (step ST102: NO), the operation control unit 91 performs control to perform the second operation (step ST103). At the time of start of the second operation, the heat-source-side heat exchanger 12 is nearly liquid-filled, but when the connection state of the flow passage switching device 11 is switched to the second connection state by the second operation, the refrigerant moves from the heat-source-side heat exchanger 12 to the accumulator 13 due to the pressure difference. On the other hand, in the case where the discharge pressure Pd is at or below the discharge pressure threshold Pdt in step ST102 (step ST102: YES), or after the process in step ST103 is performed, the operation control unit 91 performs control such that the first operation is performed, and performs refrigerant recovery (step ST104). In normal operation, the discharge pressure Pd does not exceed the discharge pressure threshold Pdt, and thus, after determination is made in step ST102 that is performed first after the refrigerant recovery operation mode is started, the first operation in step ST104 is first performed, and the first shut-off device 14 is closed. The first shut-off device 14 that is closed in the first operation that is performed first is maintained in the closed state during the second operation, the second and later first operation, and the third operation that are subsequently performed.

After step ST104 is performed, the operation control unit 91 determines whether the suction pressure Ps is smaller than the suction pressure threshold Pst (step ST105). In the case where the suction pressure Ps is at or above the suction pressure threshold Pst (step ST105: NO), the operation control unit 91 determines that refrigerant still remains in the load-side circuit 102, and continues refrigerant recovery by repeating steps ST102 to ST105.

In the case where steps ST102 to ST105 are repeated, when the heat-source-side heat exchanger 12 is nearly liquid-filled by the first operation, and the discharge pressure Pd exceeds the discharge pressure threshold Pdt (step ST102: NO), the second operation is performed (step ST103). Then, the first operation is performed again after the refrigerant in the heat-source-side heat exchanger 12 is moved to the accumulator 13 by the second operation (step ST104).

When the refrigerant in the load-side circuit 102 is recovered into the outdoor unit 1, and the suction pressure Ps falls below the suction pressure threshold Pst (step ST105: YES), the operation control unit 91 performs control such that the third operation is performed (step ST106). Flow of refrigerant between the outdoor unit 1 side including the heat-source-side heat exchanger 12 and the accumulator 13, and the load-side circuit 102 is shut off by the third operation. Furthermore, the operation control unit 91 stops the heat-source-side fan 15, and ends the refrigerant recovery operation mode (step ST107).

Additionally, a case is described above where the refrigerant recovery operation mode is started when refrigerant leakage is detected, but a configuration may also be adopted in which the refrigerant recovery operation mode is started whenever operation is ended, even in a case of the normal operation mode where refrigerant leakage is not detected. Such a configuration may reduce a risk of refrigerant leakage inside a room, and is particularly effective during summer when the temperature is lower inside a room than outside and the liquid refrigerant tends to be collected indoors.

Additionally, in the case where the amount of refrigerant inside the refrigerant circuit 110 is small, for example, the refrigerant recovery operation mode is often ended during execution of the refrigerant recovery operation mode since the suction pressure Ps is lower than the suction pressure threshold Pst without switching to the second operation.

As described above, in Embodiment 1, the air-conditioning apparatus 100 includes a refrigeration circuit, the first shut-off device 14, and the leakage detection device 83, and the controller 90 configured to perform the refrigerant recovery operation when refrigerant leakage is detected. At the time of the refrigerant recovery operation, the controller 90 performs control to conduct the first operation of recovering refrigerant from the load-side heat exchanger 21 into the accumulator 13 and the heat-source-side heat exchanger 12, and the second operation of moving the refrigerant in the heat-source-side heat exchanger 12 to the accumulator 13. In the first operation, the first shut-off device 14 is closed, the connection state of the flow passage switching device 11 is brought into the first connection state, and the compressor 10 is driven, and the second operation is performed after the first operation, and in the second operation, the connection state of the flow passage switching device 11 is switched to the second connection state in a state where the compressor 10 is operated.

Accordingly, since the connection state of the flow passage switching device 11 is switched while reducing the pressure at the accumulator 13, switching the connection state from the first operation to the second operation may be performed while preventing malfunction of the compressor 10 and the flow passage switching device 11 caused by pressure fluctuation. Furthermore, when the second operation is performed, liquid refrigerant condensed at the heat-source-side heat exchanger 12 moves to the accumulator 13 through the flow passage switching device 11, and thus, movement of the liquid refrigerant is completed in a shorter period of time than in the case of an existing configuration in which the liquid refrigerant is moved through a bypass pipe. Accordingly, the air-conditioning apparatus 100 may efficiently recover the refrigerant in the load-side circuit 102 into the heat-source-side heat exchanger 12 and the accumulator 13 by the first operation and the second operation.

Moreover, before switching the connection state of the flow passage switching device 11 to the second connection state at the time of the refrigerant recovery operation, the controller 90 performs control to increase the operating frequency of the compressor 10. The pressure at the accumulator 13 is thereby further reduced, and recovered refrigerant may be prevented from flowing out to the load-side circuit 102 at the time of the second operation and the third operation. Furthermore, due to the pressure reduction at the accumulator 13, the pressure difference between the accumulator 13 and the heat-source-side heat exchanger 12 is increased, and the refrigerant may be swiftly moved at the time of the second operation. Accordingly, the period of time during which the second operation is performed is further reduced, and refrigerant recovery is efficiently performed.

Furthermore, the controller 90 performs control to switch again to the first operation after the second operation is ended, and to reduce the operating frequency of the compressor 10 at the end of the second operation. Accordingly, the first operation is performed after the second operation, and unrecovered refrigerant may be prevented from remaining in the load-side circuit 102.

Moreover, the air-conditioning apparatus 100 further includes a heat-source-side pressure detection device (the discharge pressure sensor 81 and the suction pressure sensor 82) configured to detect the discharge pressure Pd and the suction pressure Ps of the compressor 10. When the suction pressure Ps detected by a first pressure detection device is greater than the discharge pressure Pd, the controller 90 performs control to maintain a state where the compressor 10 is accelerated. A state where the discharge pressure Pd is smaller than the suction pressure Ps may thus be reliably resolved, and malfunction of the flow passage switching device 11 and the compressor 10 may be prevented.

Moreover, the controller 90 includes a timer (the time measurement unit 92) configured to measure the time elapsed from an operation of switching of the connection state of the flow passage switching device 11, and performs control to maintain a state where the compressor 10 is accelerated, until the suction pressure Ps becomes smaller than the discharge pressure Pd or a measured time exceeds the set time Ts. Pressure fluctuation may thereby be prevented in a case where there is a time delay in the pressure fluctuation, such as a case where a pipe is long.

Moreover, the controller 90 performs control to increase the opening degree of the expansion device 20 after the flow passage switching device 11 is switched to the first connection state at the time of the refrigerant recovery operation. Furthermore, the controller 90 performs control to reduce the opening degree of the expansion device 20 before the connection state of the flow passage switching device 11 is switched to the second connection state at the time of the refrigerant recovery operation. The refrigerant in the entire refrigerant circuit 110 may be recovered by increasing the opening degree of the expansion device 20, and a reduction in the discharge pressure Pd may be prevented by reducing the opening degree of the expansion device 20.

Furthermore, at the time of the refrigerant recovery operation, the controller 90 performs control to perform the third operation of stopping the compressor 10, after switching the connection state of the flow passage switching device 11 to the second connection state. Accordingly, refrigerant recovered and stored in the heat-source-side heat exchanger 12 and the accumulator 13 may be prevented from flowing out to the load-side circuit 102, and a recovery rate of the refrigerant is increased.

Furthermore, the controller 90 performs control such that, after the second operation, an operation combining the first operation and the second operation that is performed after the first operation is performed one or plural times, and the first operation is then performed, and the third operation is then performed. Accordingly, refrigerant flowing out to the load-side circuit 102 during the second operation when the flow passage switching device 11 is in the second connection state may be recovered by the next first operation, and the recovery rate of refrigerant by the refrigerant recovery operation is increased.

Furthermore, the controller 90 performs control in the normal operation such that the first operation is performed whenever operation is stopped. Accordingly, the amount of refrigerant present in the load-side circuit 102 when operation is not performed may be reduced, and leakage of refrigerant indoors may be prevented even in a case where a trouble of refrigerant leakage from a pipe or the like of the load-side circuit 102 occurs.

Moreover, the air-conditioning apparatus 100 further includes the heat-source-side fan 15 configured to supply air to the heat-source-side heat exchanger 12, and the load-side fan 22 configured to supply air to the load-side heat exchanger 21. Furthermore, in the refrigerant recovery operation, the controller 90 sets the maximum values of the rotation speed of the heat-source-side fan 15 and the load-side fan 22 and the upper limit value of the operating frequency of the compressor 10 to be higher than at the time of the normal operation, and sets the lower limit value of the operating frequency of the compressor 10 to be lower than that at the time of the normal operation.

Condensation at the heat-source-side heat exchanger 12 and evaporation at each load-side heat exchanger 21 may thereby be promoted, and the refrigerant recovery speed may be increased. Furthermore, the compressor 10 may be driven at the time of the refrigerant recovery operation, at a lower frequency than at the time of the normal operation, and the flow rate of the compressor 10 may be suppressed to or below the condensation rate, and refrigerant may be recovered even at the time of the year or in a region where an outside temperature is high and condensation does not easily occur.

Embodiment 2

Figure 12:
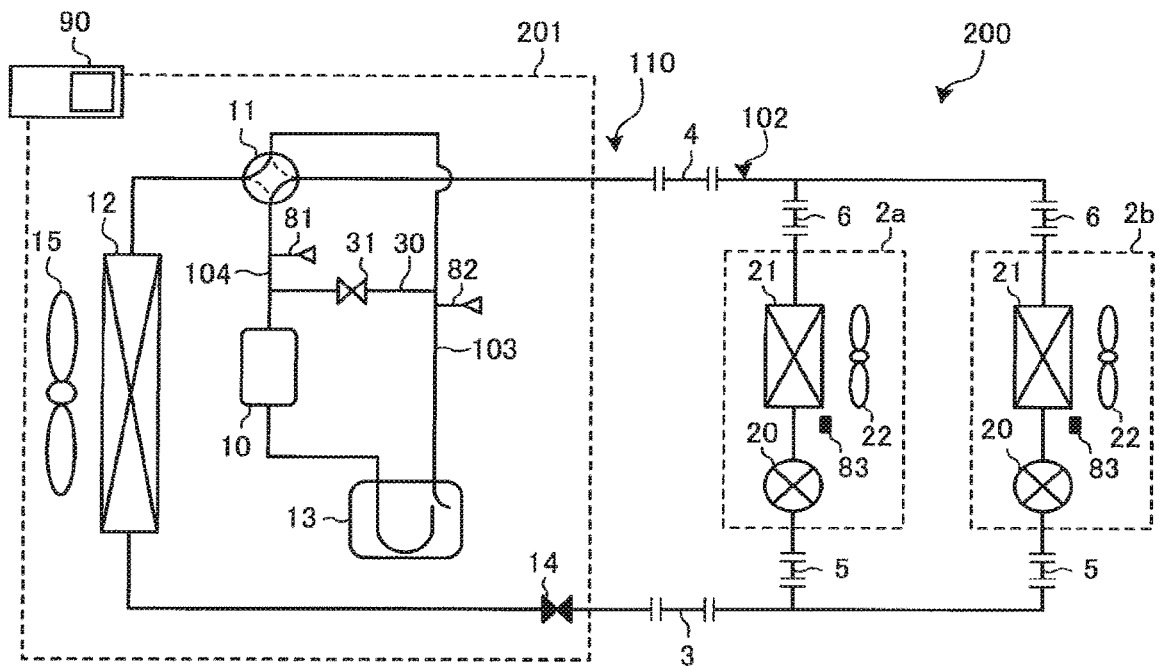
FIG. 12 is a diagram schematically showing an example of a circuit configuration of an air-conditioning apparatus according to Embodiment 2 of the present disclosure.

FIG. 12 is a diagram schematically showing an example of a circuit configuration of an air-conditioning apparatus according to Embodiment 2 of the present disclosure. Parts of an air-conditioning apparatus 200 in FIG. 12 having same configurations as those of the air-conditioning apparatus 100 in FIG. 1 are denoted by same reference signs, and a description thereof is omitted. The air-conditioning apparatus 200 of Embodiment 2 is different from that of Embodiment 1 with respect to the configuration of an outdoor unit 201.

In Embodiment 2, the outdoor unit 201 further includes a bypass pipe 30 and a bypass valve 31. The bypass pipe 30 connects a pipe 103 between the flow passage switching device 11 and the accumulator 13, and a pipe 104 at the discharge port of the compressor 10. The bypass valve 31 is provided on the bypass pipe 30, and adjusts the amount of refrigerant that flows through the bypass pipe 30.

Moreover, the matters to be controlled in the second operation and the third operation in Embodiment 2 are different from those in Embodiment 1. That the controller 90 performs control, at the start of the second operation and the third operation, of continuing operation of the compressor 10, and of performing the throttle operation for each expansion device 20 and the acceleration operation for the compressor 10 is the same as in the case of Embodiment 1. Furthermore, the conditions for ending the second operation and the third operation are also the same as in the case of Embodiment 1.

In Embodiment 2, a pressure equalization operation of opening the bypass valve 31 and equalizing the discharge pressure and the suction pressure is further performed at the start of the second operation and the third operation. After the pressure equalization operation, the controller 90 performs control to switch the connection state of the flow passage switching device 11 to the second connection state in a state where the bypass valve 31 is open. The controller 90 maintains the state where the bypass valve 31 is open until the ending condition is satisfied, and performs control to close the bypass valve 31 when the ending condition is satisfied. That is, in the second operation shown in FIG. 7, control is performed such that the bypass valve 31 is opened before the process in step ST23, and such that the bypass valve 31 is closed when the condition in step ST25 or the condition in step ST26 is satisfied. Accordingly, in the first operation that is performed after the second operation, the connection state of the flow passage switching device 11 is switched to the first connection state (step ST11), in a state where the bypass valve 31 is closed. Furthermore, in the third operation shown in FIG. 9, the bypass valve 31 is opened before the process in step ST33, and in a case where the condition in step ST34 is satisfied, control is performed to stop the compressor 10 (step ST35), and to close the bypass valve 31.

In particular, in the case where the acceleration operation is performed for the compressor 10 in the second operation and the third operation, high pressure may be prevented from being excessively increased before switching of the connection state of the flow passage switching device 11, by the pressure equalization operation of the bypass valve 31 described above. Furthermore, opening the bypass valve 31 allows the liquid refrigerant in the heat-source-side heat exchanger 12 to be moved to the accumulator 13.

Figure 13:
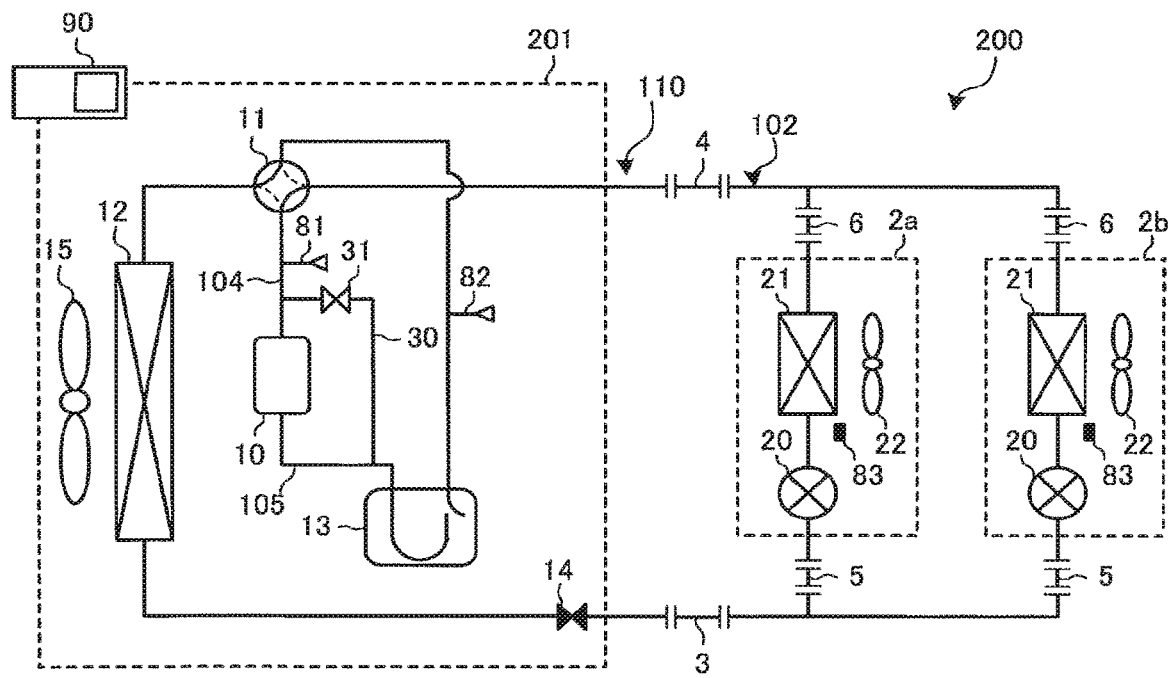
FIG. 13 is a diagram showing a modification example of the circuit configuration of the air-conditioning apparatus in FIG. 12.

FIG. 13 is a diagram showing a modification example of the circuit configuration of the air-conditioning apparatus in FIG. 12. As shown in FIG. 13, the bypass pipe 30 may be alternatively provided to connect a pipe 105 at the suction port of the compressor 10 and the pipe 104 at the discharge port of the compressor 10. In this case, preferably, a position where the bypass pipe 30 is joined to the pipe 104 is higher than a position where the bypass pipe 30 is joined to the pipe 105, and the bypass pipe 30 is joined to the pipe 105 from above in the vertical direction.

According to such a configuration, when the bypass valve 31 is opened before switching the connection state of the flow passage switching device 11, liquid refrigerant moving from the heat-source-side heat exchanger 12 to the bypass pipe 30 through the flow passage switching device 11 moves to the accumulator 13 due to its own weight. Accordingly, a pipe configuration as described above may prevent liquid refrigerant passing through the bypass pipe 30 from flowing into the compressor 10.

As described above, in Embodiment 2, the air-conditioning apparatus 200 includes the bypass pipe 30 that connects the discharge port of the compressor 10 (i.e., the pipe 104) and the suction port (i.e., the pipe 103 or the pipe 105), and the bypass valve 31 configured to adjust the amount of refrigerant that flows through the bypass pipe 30. At the time of the refrigerant recovery operation, the controller 90 performs control to close the bypass valve 31 before switching the connection state of the flow passage switching device 11 to the first connection state and at the time of stopping the compressor 10. Furthermore, at the time of refrigerant recovery operation, the controller 90 performs control to open the bypass valve 31 before switching the connection state of the flow passage switching device 11 to the second connection state. Accordingly, since the discharge port and the suction port of the compressor 10 communicate with each other at the time of switching the connection state of the flow passage switching device 11 to the second connection state, a state where the discharge pressure Pd is lower than the suction pressure Ps may be prevented. Moreover, even in a case where the bypass pipe 30 is provided, since the bypass valve 31 is closed at the time of the first operation and after the refrigerant recovery operation is ended, a refrigerant passage at the time of the first operation is secured as in Embodiment 1, and refrigerant may be prevented from flowing out to the load-side circuit 102 after the refrigerant recovery operation is ended.

Embodiment 3

Figure 14:
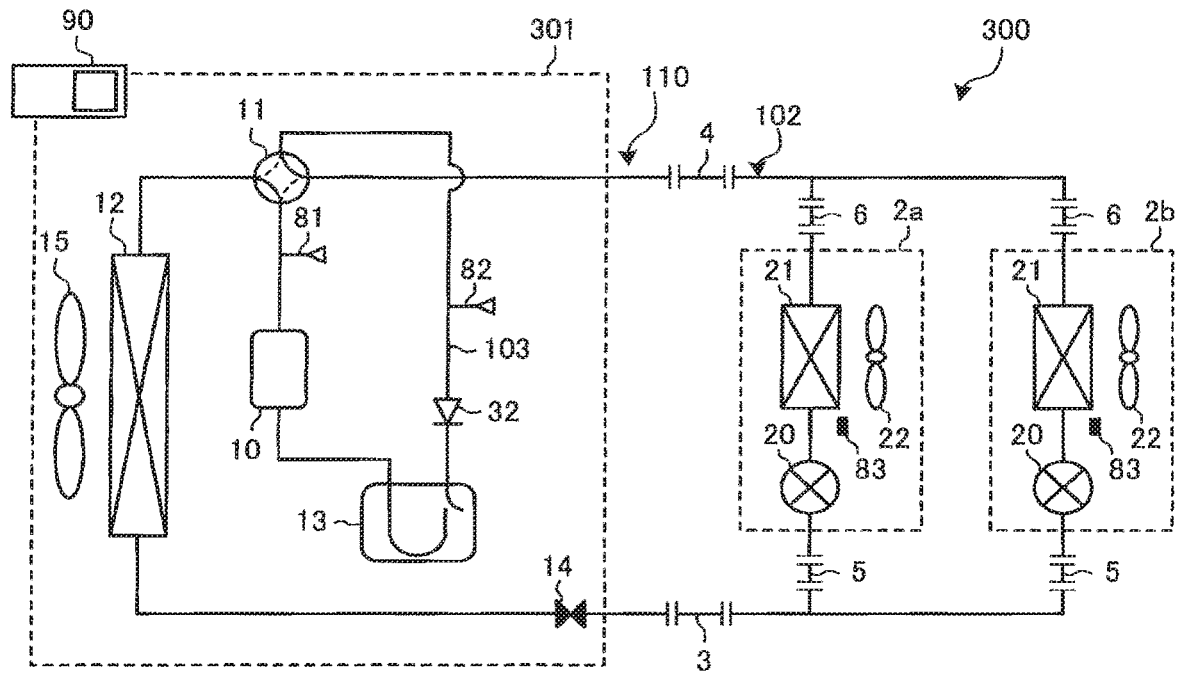
FIG. 14 is a diagram schematically showing an example of a circuit configuration of an air-conditioning apparatus according to Embodiment 3 of the present disclosure.

FIG. 14 is a diagram schematically showing an example of a circuit configuration of an air-conditioning apparatus according to Embodiment 3 of the present disclosure. Parts of an air-conditioning apparatus 300 in FIG. 14 having same configurations as those of the air-conditioning apparatus 100 in FIG. 1 are denoted by same reference signs, and a description thereof is omitted. The air-conditioning apparatus 300 of Embodiment 3 is different from that of Embodiment 1 with respect to the configuration of an outdoor unit 301.

In Embodiment 3, the outdoor unit 301 further includes a check valve 32. The check valve 32 is provided on the pipe 103 between the flow passage switching device 11 and the accumulator 13, and shuts off a flow from the accumulator 13 to the flow passage switching device 11. Additionally, the check valve 32 may be a solenoid valve or another valve that can be opened or closed by a signal from the controller 90.

Moreover, matters to be controlled in the third operation in Embodiment 3 are different from those in Embodiment 1. In the third operation in Embodiment 3, the controller 90 controls the flow passage switching device 11 to be in the first connection state, and stops the compressor 10. That is, the connection state of the flow passage switching device 11 does not have to be switched from the first connection state at the time of the first operation, and the acceleration operation for the compressor 10 and the throttle operation for each expansion device 20 are also unnecessary. At this time, the outdoor unit 1 and each indoor unit 2a, 2b are separated from each other by the check valve 32 and the first shut-off device 14. Additionally, the controller 90 may be configured to control each expansion device 20 to close, at the time of stopping the compressor 10.

As described above, in Embodiment 3, the air-conditioning apparatus 300 further includes, between the flow passage switching device 11 and the accumulator 13, a valve (such as the check valve 32) that shuts off the flow of refrigerant flowing from the accumulator 13 to the flow passage switching device 11. Furthermore, at the time of the refrigerant recovery operation, the controller 90 performs control to perform the third operation of stopping the compressor 10, after bringing the connection state of the flow passage switching device 11 into the first connection state.

Accordingly, since the connection state of the flow passage switching device 11 is in the first connection state, refrigerant that is recovered to a pipe near the outdoor unit 1 may be prevented from returning to the load-side circuit 102. Furthermore, refrigerant stored in the accumulator 13 may be prevented, by the check valve 32, from evaporating and flowing out to the load-side circuit 102 again. In this manner, with the air-conditioning apparatus 300 in Embodiment 3, compared with Embodiment 1, refrigerant may be prevented from flowing out again through the main gas pipe 4, and the recovery rate of refrigerant is increased. Furthermore, the connection state of the flow passage switching device 11 is the same for the first operation and the third operation, and thus, the frequency of switching the connection state of the flow passage switching device 11 may be reduced.

Embodiment 4

Figure 15:
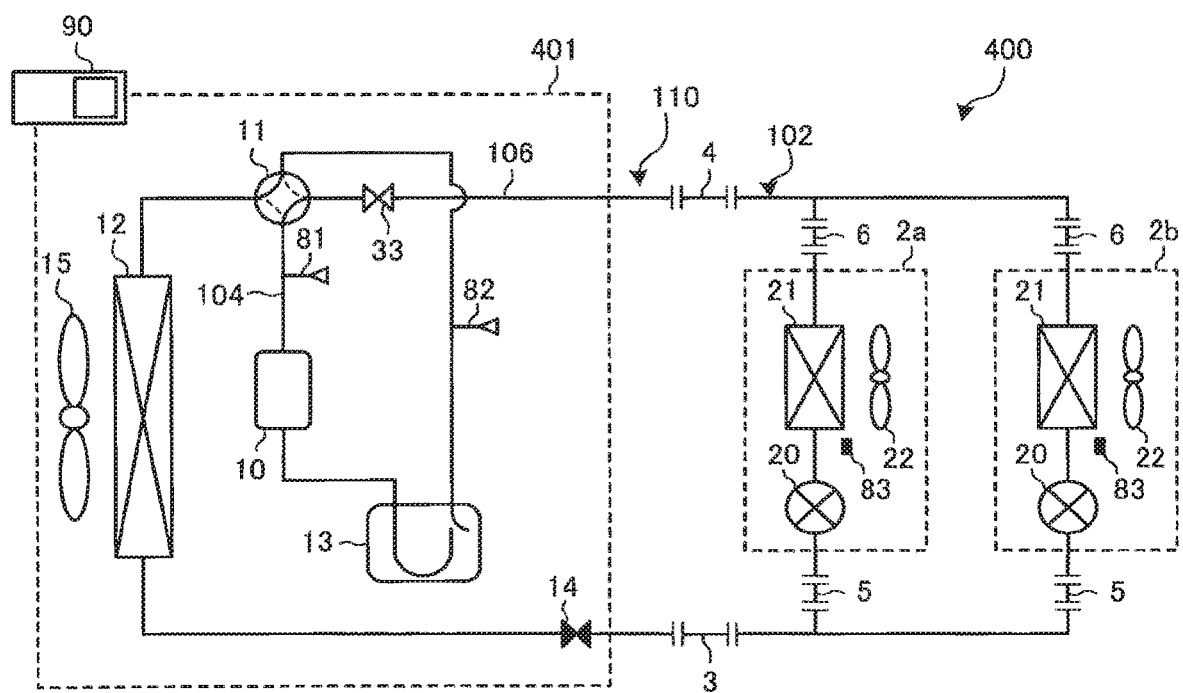
FIG. 15 is a diagram schematically showing an example of a circuit configuration of an air-conditioning apparatus according to Embodiment 4 of the present disclosure.

FIG. 15 is a diagram schematically showing an example of a circuit configuration of an air-conditioning apparatus according to Embodiment 4 of the present disclosure. Parts of an air-conditioning apparatus 400 in FIG. 15 having same configurations as those of the air-conditioning apparatus 100 in FIG. 1 are denoted by same reference signs, and a description thereof is omitted. The air-conditioning apparatus 400 of Embodiment 4 is different from that of Embodiment 1 relative to the configuration of an outdoor unit 401.

In Embodiment 4, the outdoor unit 401 further includes a second shut-off device 33 provided on a pipe between the flow passage switching device 11 and the load-side heat exchangers 21. For example, the second shut-off device 33 is a solenoid valve or another valve that can be opened or closed by a signal from the controller 90.

In the third operation in Embodiment 4, in addition to the control indicated in FIG. 9, the controller 90 performs control to close the second shut-off device 33. When the third operation is performed, the outdoor unit 1 and each indoor unit 2a, 2b are separated from each other by the compressor 10, the second shut-off device 33, and the first shut-off device 14. Furthermore, the outdoor unit 1 and each indoor unit 2a, 2b may be separated from each other by the first shut-off device 14 and the second shut-off device 33, even in a case where malfunction of the flow passage switching device 11 and the compressor 10 is caused by pressure fluctuation or the like occurring at the time of switching from the first operation to the second operation, for example. In particular, in a case where the second shut-off device 33 is provided on a pipe 106 between the flow passage switching device 11 and the main gas pipe 4, as shown in FIG. 15, refrigerant is prevented from flowing out to the load-side circuit 102.

Figure 16:
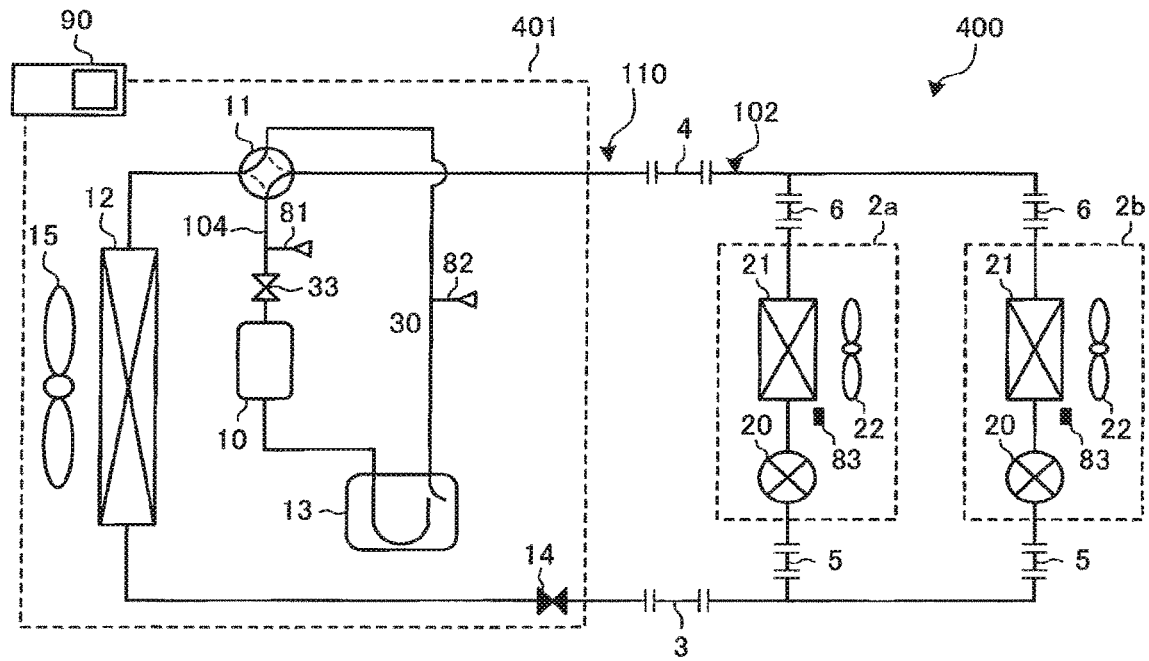
FIG. 16 is a diagram showing a modification example of the circuit configuration of the air-conditioning apparatus in FIG. 15.

FIG. 16 is a diagram showing an example modification of the circuit configuration of the air-conditioning apparatus in FIG. 15. As shown in FIG. 16, the second shut-off device 33 may be provided on the pipe 104 between the flow passage switching device 11 and the compressor 10. In this case, when the flow passage switching device 11 stops normal operation, the outdoor unit 1 and each indoor unit 2a, 2b cannot be separated from each other even when the second shut-off device 33 is closed by the third operation. Accordingly, the flow passage switching device 11 has to be configured in such a way that the flow passage switching device 11 does not break even when the suction pressure exceeds the discharge pressure.

As described above, in Embodiment 4, the air-conditioning apparatus 400 further includes the second shut-off device 33 that is provided between the compressor 10 and the load-side heat exchangers 21. Accordingly, even in a case where the compressor 10 does not function as a shut-off device after stopping, refrigerant stored in the accumulator 13 may be prevented from evaporating and moving to each load-side heat exchanger 21 again. Therefore, with the air-conditioning apparatus 300 in Embodiment 3, compared with Embodiment 1, refrigerant may be prevented from flowing out again through the main gas pipe 4 more reliably, and the recovery rate of refrigerant is increased.

Embodiment 5

Figure 17:
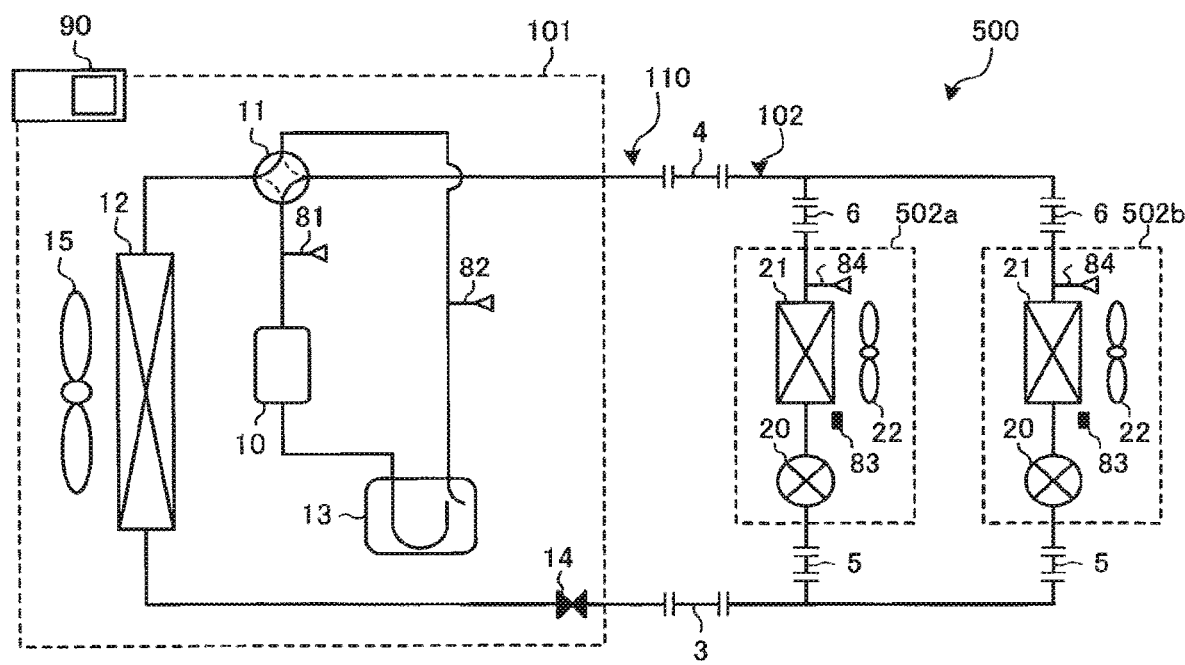
FIG. 17 is a diagram schematically showing an example of a circuit configuration of an air-conditioning apparatus according to Embodiment 5 of the present disclosure.

FIG. 17 is a diagram schematically showing an example of a circuit configuration of an air-conditioning apparatus according to Embodiment 5 of the present disclosure. Parts of an air-conditioning apparatus 500 in FIG. 17 having same configurations as those of the air-conditioning apparatus 100 in FIG. 1 are denoted by same reference signs, and a description thereof is omitted. The air-conditioning apparatus 500 of Embodiment 5 is different from that of Embodiment 1 with respect to the configuration of each indoor unit 502a, 502b. In Embodiment 5, the indoor units 502a, 502b each include a load-side pressure sensor 84 configured to detect a pressure Pi of refrigerant at the respective load-side heat exchanger 21.

Furthermore, in Embodiment 5, a starting condition for the refrigerant recovery operation mode is different from that in Embodiment 1. The controller 90 starts the refrigerant recovery operation mode also in a case where the pressure Pi at or above a load-side pressure threshold Pit is detected at at least one of the load-side pressure sensors 84 after the refrigerant recovery operation mode is ended, in addition to when refrigerant leakage is detected by at least one of the leakage detection devices 83. The load-side pressure threshold Pit here is set in advance and is stored in the memory unit 93.

As described above, in Embodiment 5, the air-conditioning apparatus 500 further includes a load-side pressure detection device (each load-side pressure sensor 84) configured to detect a pressure of refrigerant at the load-side heat exchanger 21. Moreover, after the third operation, the controller 90 again performs control to perform the first operation, in a case where the pressure Pi detected by the load-side pressure detection device is at or greater than the load-side pressure threshold Pit that is set in advance.

Accordingly, in a case where unrecovered liquid refrigerant remains in the load-side circuit 102, when the liquid refrigerant evaporates and the pressure of refrigerant is increased at one of the load-side heat exchangers 21, the first operation is performed, and the unrecovered refrigerant may be recovered into the outdoor unit 1, and the recovery rate may be increased.

Additionally, the embodiments of the present disclosure are not limited to the embodiments described above, and may be modified in various ways. For example, in FIG. 1, two indoor units 2a, 2b are connected to the outdoor unit 1 in parallel to each other by the liquid main pipe 3, the main gas pipe 4, the two liquid branch pipes 5, and the two branch gas pipes 6, but the number of indoor units may be one or three or more.

Furthermore, FIG. 1 shows a case where the controller 90 is provided in the outdoor unit 1, but the controller 90 may alternatively be provided in each of the outdoor unit 1 and the indoor units 2a, 2b, or in at least one of the two indoor units 2a, 2b.

REFERENCE SIGNS LIST

1, 201, 301, 401 outdoor unit 2a, 2b, 502a, 502b indoor unit 3 liquid main pipe 4 main gas pipe 5 liquid branch pipe 6 branch gas pipe 10 compressor 11 flow passage switching device 12 heat-source-side heat exchanger 13 accumulator 14 first shut-off device 15 heat-source-side fan 20 expansion device 21 load-side heat exchanger 22 load-side fan 30 bypass pipe 31 bypass valve 32 check valve 33 second shut-off device 81 discharge pressure sensor 82 suction pressure sensor 83 leakage detection device 84 load-side pressure sensor 90 controller 91 operation control unit 92 time measurement unit 93 memory unit 100, 200, 300, 400, 500 air-conditioning apparatus 102 load-side circuit 103, 104, 105, 106 pipe 110 refrigerant circuit PL lowest operating pressure Pd discharge pressure Pdt discharge pressure threshold Ps suction pressure Pst suction pressure threshold Ts set time

The invention claimed is:

1. An air-conditioning apparatus comprising:
a refrigeration circuit where a compressor, a flow passage switching device, a heat-source-side heat exchanger, an expansion device, a load-side heat exchanger, and an accumulator are connected by pipes, the compressor being configured to compress and discharge refrigerant, the flow passage switching device being provided on a discharge port of the compressor and configured to switch a flow of the refrigerant, the expansion device being configured to decompress the refrigerant, the load-side heat exchanger being configured to condition air inside a room, the accumulator being provided on a suction port of the compressor and configured to store liquid refrigerant;
a first shut-off device provided on a pipe connecting the heat-source-side heat exchanger and the expansion device;
a leakage detection device configured to detect refrigerant leakage inside the room; and
a controller configured to switch from a normal operation to a refrigerant recovery operation and perform the refrigerant recovery operation, in a case where refrigerant leakage is detected by the leakage detection device,
wherein the controller
controls switching of a connection state of the flow passage switching device between
a first connection state in which the discharge port of the compressor is connected to the heat-source-side heat exchanger, and the suction port of the compressor is connected to the load-side heat exchanger through the accumulator, and
a second connection state in which the discharge port of the compressor is connected to the load-side heat exchanger, and the suction port of the compressor is connected to the heat-source-side heat exchanger through the accumulator, and
performs control to perform, at the time of the refrigerant recovery operation,
a first operation of closing the first shut-off device, bringing the connection state of the flow passage switching device into the first connection state, and recovering the refrigerant from the load-side heat exchanger into the accumulator and the heat-source-side heat exchanger by driving of the compressor, and
a second operation, performed after the first operation, of switching the connection state of the flow passage switching device to the second connection state in a state where the compressor is being driven, and moving the refrigerant that is condensed at the heat-source-side heat exchanger to the accumulator.

2. The air-conditioning apparatus of claim 1, wherein the controller performs control to increase an operating frequency of the compressor, before switching the connection state of the flow passage switching device to the second connection state at the time of the refrigerant recovery operation.

3. The air-conditioning apparatus of claim 2, wherein the controller performs control to switch again to the first operation after the second operation is ended, and to reduce a frequency of the compressor at an end of the second operation.

4. The air-conditioning apparatus of claim 2, further comprising a heat-source-side pressure detection device configured to detect a discharge pressure and a suction pressure of the compressor,
wherein the controller performs control to maintain a state where the compressor is accelerated, when the suction pressure detected by the heat-source-side pressure detection device is greater than the discharge pressure.

5. The air-conditioning apparatus of claim 4, wherein
the controller includes a timer configured to measure a time from a switching operation of the flow passage switching device, and
the controller performs control to maintain the state where the compressor is accelerated, until the suction pressure that is detected by the heat-source-side pressure detection device becomes smaller than the discharge pressure, or until a measured time of the timer exceeds a set time that is set in advance.

6. The air-conditioning apparatus of claim 1, wherein, at the time of the refrigerant recovery operation, the controller
controls to increase an opening degree of the expansion device after switching the connection state of the flow passage switching device to the first connection state, and
controls to reduce the opening degree of the expansion device before switching the connection state of the flow passage switching device to the second connection state.

7. The air-conditioning apparatus of claim 1, further comprising:
a bypass pipe connecting the discharge port and the suction port of the compressor; and
a bypass valve provided on the bypass pipe, and configured to adjust an amount of refrigerant that flows through the bypass pipe,
wherein, at the time of the refrigerant recovery operation, the controller
controls to close the bypass valve before switching the connection state of the flow passage switching device to the first connection state, and at the time of stopping the compressor, and
controls to open the bypass valve before switching the connection state of the flow passage switching device to the second connection state.

8. The air-conditioning apparatus of claim 1, wherein, at the time of the refrigerant recovery operation, the controller performs control to perform a third operation of stopping the compressor, after switching the connection state of the flow passage switching device to the second connection state.

9. The air-conditioning apparatus of claim 8, wherein the controller performs control such that, after the second operation, an operation combining the first operation and the second operation that is performed after the first operation is performed one or plural times, and the first operation is then performed, and the third operation is then performed.

10. The air-conditioning apparatus of claim 1, further comprising a valve provided between the flow passage switching device and the accumulator, the valve being configured to shut off a flow of refrigerant from the accumulator to the flow passage switching device,
wherein, at the time of the refrigerant recovery operation, the controller performs control to perform a third operation of stopping the compressor, after bringing the connection state of the flow passage switching device into the first connection state.

11. The air-conditioning apparatus of claim 1, further comprising a second shut-off device provided between the compressor and the load-side heat exchanger.

12. The air-conditioning apparatus of claim 8, further comprising a load-side pressure detection device configured to detect a pressure of the refrigerant at the load-side heat exchanger,
wherein the controller performs, after the third operation, control to perform the first operation again, in a case where the pressure detected by the load-side pressure detection device is at or greater than a load-side pressure threshold that is set in advance.

13. The air-conditioning apparatus of claim 1, wherein the controller performs control in the normal operation such that the first operation is performed whenever operation is stopped.

14. The air-conditioning apparatus of claim 1, further comprising:
a heat-source-side fan configured to supply air to the heat-source-side heat exchanger; and
a load-side fan configured to supply air to the load-side heat exchanger,
wherein, in the refrigerant recovery operation, the controller sets a maximum value of rotation speed of the heat-source-side fan, a maximum value of rotation speed of the load-side fan, and an upper limit value of an operating frequency of the compressor to be higher than at the time of the normal operation, and sets a lower limit value of the operating frequency of the compressor to be lower than at the time of the normal operation.

* * * * *